(12) United States Patent
Anani et al.

(10) Patent No.: US 11,715,863 B2
(45) Date of Patent: Aug. 1, 2023

(54) SOLID POLYMER MATRIX ELECTROLYTES (PME) AND METHODS AND USES THEREOF

(71) Applicant: BRIGHTVOLT, INC., Redmond, WA (US)

(72) Inventors: Anaba Anani, Bloomington, IN (US); Chananate Uthaisar, Bloomington, IN (US); Joshua Wolfe, Linton, IN (US); Han Wu, Auburndale, FL (US); Huikang Wu, Bloomington, IN (US); Wenbin Yin, Bloomington, IN (US)

(73) Assignee: BRIGHTVOLT, INC., Redmond, WA (US)

( * ) Notice: Subject to any disclaimer, the term of this patent is extended or adjusted under 35 U.S.C. 154(b) by 128 days.

(21) Appl. No.: 17/064,448

(22) Filed: Oct. 6, 2020

(65) Prior Publication Data

US 2022/0109133 A1    Apr. 7, 2022

Related U.S. Application Data

(63) Continuation-in-part of application No. PCT/US2019/045495, filed on Aug. 7, 2019.

(60) Provisional application No. 62/715,829, filed on Aug. 8, 2018.

(51) Int. Cl.
*H01M 50/411* (2021.01)
*H01M 10/0565* (2010.01)
*H01M 50/403* (2021.01)
*C08L 27/16* (2006.01)

(52) U.S. Cl.
CPC .......... *H01M 50/411* (2021.01); *C08L 27/16* (2013.01); *H01M 10/0565* (2013.01); *H01M 50/403* (2021.01); *H01M 2300/0082* (2013.01)

(58) Field of Classification Search
CPC .......... H01M 50/411; H01M 10/0565; H01M 50/403; H01M 2300/0082; C08L 27/16
See application file for complete search history.

(56) References Cited

U.S. PATENT DOCUMENTS

| 5,858,264 A | * | 1/1999 | Ichino ................. H01M 10/052 |
| | | | 204/252 |
| 5,874,185 A | | 2/1999 | Wang et al. |
| 6,165,641 A | | 12/2000 | Striebel et al. |
| 9,240,257 B2 | | 1/2016 | Johnson et al. |

(Continued)

FOREIGN PATENT DOCUMENTS

| CN | 103855423 A | 11/2012 |
| CN | 106165154 A | 11/2016 |

(Continued)

OTHER PUBLICATIONS

Liu et al. "A novel non-porous separator based on single-ion conducting triblock copolymer for stable lithium electrodeposition", Journal of Power Sources, 419 (2019) 58-64. (Year: 2019).*

(Continued)

*Primary Examiner* — Stewart A Fraser
(74) *Attorney, Agent, or Firm* — Perkins Coie LLP

(57) ABSTRACT

The present disclosure provides methods of preparing a solid-state polymer matrix electrolyte (PME) and methods for preparing a PME precursor solution for forming the PME for use in battery technologies.

31 Claims, 11 Drawing Sheets

(56) References Cited

U.S. PATENT DOCUMENTS

| | | | |
|---|---|---|---|
| 10,286,115 B2 | 5/2019 | Chen et al. | |
| 10,511,012 B2 | 12/2019 | Fasching et al. | |
| 10,535,878 B2 | 1/2020 | Chao et al. | |
| 10,559,827 B2 | 2/2020 | Zimmerman et al. | |
| 10,563,918 B2 | 2/2020 | Iyer et al. | |
| 10,741,877 B1 | 8/2020 | Zimmerman | |
| 10,784,497 B2 | 9/2020 | Holme et al. | |
| 10,804,564 B2 | 10/2020 | Allenic et al. | |
| 10,811,688 B2 | 10/2020 | Zimmerman et al. | |
| 2005/0250015 A1 | 11/2005 | Wensley et al. | |
| 2019/0356012 A1 | 11/2019 | Hermann | |
| 2019/0359083 A1 | 11/2019 | Hettrich et al. | |
| 2019/0372158 A1 | 12/2019 | Choi et al. | |
| 2020/0003494 A1 | 1/2020 | Iyer et al. | |
| 2020/0006806 A1 | 1/2020 | Allenic et al. | |
| 2020/0014055 A1 | 1/2020 | Hermann | |
| 2020/0067126 A1 | 2/2020 | Han et al. | |
| 2020/0067137 A1 | 2/2020 | Van Berkel et al. | |
| 2020/0144620 A1 | 5/2020 | Zimmerman et al. | |
| 2020/0161696 A1 | 5/2020 | Hermann et al. | |
| 2020/0168951 A1 | 5/2020 | Zimmerman et al. | |
| 2020/0176743 A1 | 6/2020 | Chen et al. | |
| 2020/0235420 A1* | 7/2020 | Yushin | H01M 10/0525 |
| 2020/0251741 A1 | 8/2020 | Chao et al. | |
| 2020/0303773 A1 | 9/2020 | Zimmerman | |
| 2021/0020897 A1 | 1/2021 | Holme et al. | |
| 2021/0288381 A1* | 9/2021 | Hu | H01M 50/44 |
| 2022/0069349 A1* | 3/2022 | Kotov | H01M 50/44 |

FOREIGN PATENT DOCUMENTS

| | | |
|---|---|---|
| CN | 108963327 A | 5/2017 |
| CN | 112154564 A | 12/2020 |
| CN | 112243543 A | 1/2021 |
| EP | 3078069 A1 | 10/2016 |
| EP | 3111493 A1 | 1/2017 |
| EP | 3127177 A1 | 2/2017 |
| EP | 3601159 A1 | 2/2020 |
| EP | 3642899 A1 | 4/2020 |
| EP | 3718156 A1 | 10/2020 |
| EP | 3729551 A1 | 10/2020 |
| JP | 6668231 B2 | 2/2020 |
| JP | 2020507182 A | 3/2020 |
| WO | 2018236394 A1 | 12/2018 |
| WO | 2019078897 A1 | 4/2019 |
| WO | 2019126532 A1 | 6/2019 |
| WO | 2020033538 A1 | 8/2019 |
| WO | 2019213159 A1 | 11/2019 |
| WO | 2019236904 A1 | 12/2019 |
| WO | 2019241745 A1 | 12/2019 |
| WO | 2020072524 A1 | 4/2020 |
| WO | 2020081718 A1 | 4/2020 |
| WO | 2020112969 A1 | 6/2020 |
| WO | 2020153973 A1 | 7/2020 |
| WO | 2020205450 A1 | 10/2020 |

OTHER PUBLICATIONS

International Search Report and Written Opinion of International Application No. PCT/US2021/053712; dated Feb. 18, 2022; 12 pages.

* cited by examiner

SOLID POLYMER MATRIX ELECTROLYTES (PME) AND METHODS AND USES THEREOF

TECHNICAL FIELD

This application relates generally to lithium battery technology and, in particular, to improved solid electrolytes for rechargeable lithium batteries and batteries made therewith.

BACKGROUND

Due to their high energy density and cycling performance, lithium ion batteries have become the most commonly used power sources in a wide range of applications to include consumer electronics products, electric transportation tools, and clean energy storage systems. Lithium ion batteries incorporate a liquid electrolyte that is dispersed over an ensemble comprised of a separator positioned between a positive and negative electrode. Conventionally, separators are comprised of polyethylene (PE) and polypropylene (PP). However, when the separator is damaged, for example, by deformation or external impact, the battery can short-circuit, which may lead to dangerous situations, such as overheating, fire, and explosions. As a result of these safety problems, the use of lithium ion batteries by the general public is limited.

Accordingly, there is a need for the development advanced polymer electrolyte for use in preparing safer and more reliable batteries.

SUMMARY

In some aspects, the present disclosure provides methods of preparing a polymer matrix electrolyte (PME) precursor solution, the methods comprising: (a) preparing a first solution comprising at least one polymer and a solvent; (b) preparing a second solution comprising a lithium salt, and a solvent; and (c) mixing the first solution with the second solution to form the PME precursor solution. In some embodiments, the methods further comprise dry casting the PME precursor solution onto a substrate to form a PME membrane.

In other aspects, the present disclosure provides methods of preparing a PME membrane, the method comprising: (a) preparing a precursor solution comprising at least one polymer, at least one lithium salt, and at least one additive in a solvent; (b) dry casting the precursor solution onto a substrate to form the PME membrane, wherein the PME membrane has no or substantially no pores. In some embodiments, the precursor solution is formed by (a) preparing a first solution comprising at least one polymer and a solvent; (b) preparing a second solution comprising a lithium salt, and a solvent; and (c) mixing the first solution with the second solution to form the precursor solution.

In some embodiments, the substrate is an electrode or a dielectric film and the precursor solution is dry casted onto the surface of the electrode. In some embodiments, the methods further comprise removing the membrane from the substrate to from a free-standing membrane. In some embodiments, the methods are performed under inert gas conditions, anhydrous conditions, or both.

In some embodiments, the methods further comprise preparing a third solution comprising a lithium salt and one or more additives in a solvent and mixing the third solution with the first and second solution in step (c). In some embodiments, the second solution further comprises one or more additives, one or more plasticizers, or both. In some embodiments, the one or more additives is selected from the group consisting of an inorganic particle, flame retardant, surfactant, film former, dissociation agent, and phase separation solution.

In some embodiments, the mass ratio of the polymer in the PME precursor solution can be about 1%, about 5%, about 25%, about 33%, about 50%, about 60%, about 70%, or about 80%. In some embodiments, the PME precursor solution comprises solvent in a mass fraction of about 20% to about 90%. In yet another embodiment, the PME precursor solution comprises the lithium salt in a mass fraction of about 1% to about 50%. In another embodiment, the PME precursor solution comprises the plasticizer in a mass fraction of about 1% to about 60%. In one embodiment, the mass ratio of the lithium salt to the PME precursor solution is about 1% to about 65%. In some embodiments, the mass ratio of the plasticizer to the PME precursor solution is about 1% to about 65%.

In yet another aspect, the present disclosure provides a PME membrane having mechanical strength of about $10^5$ to about $10^{10}$ pascals (Pa), wherein the PME membrane has no or substantially no pores.

In some embodiments, the PME membrane has a thickness of about 5 μm to about 100 μm. In some embodiments, the PME membrane is stable up to a temperature of about 100° C. In yet another embodiment, the PME membrane is ionically conducting over a temperature range of about −20° C. to about 90° C.

In some embodiments, the PME membrane has a storage modulus of about $3.33 \times 10^8$ Pa and a loss modulus of $2.82 \times 10^7$ Pa at 20° C. In yet another embodiment, the PME membrane has a storage modulus of $9.58 \times 10^7$ Pa and a loss modulus of $1.38 \times 10^7$ Pa at 100° C.

BRIEF DESCRIPTION OF THE DRAWINGS

The skilled artisan will understand that the drawings, described below, are for illustration purposes only. The drawings are not intended to limit the scope of the present teachings in any way.

DETAILED DESCRIPTION

Figure 1:
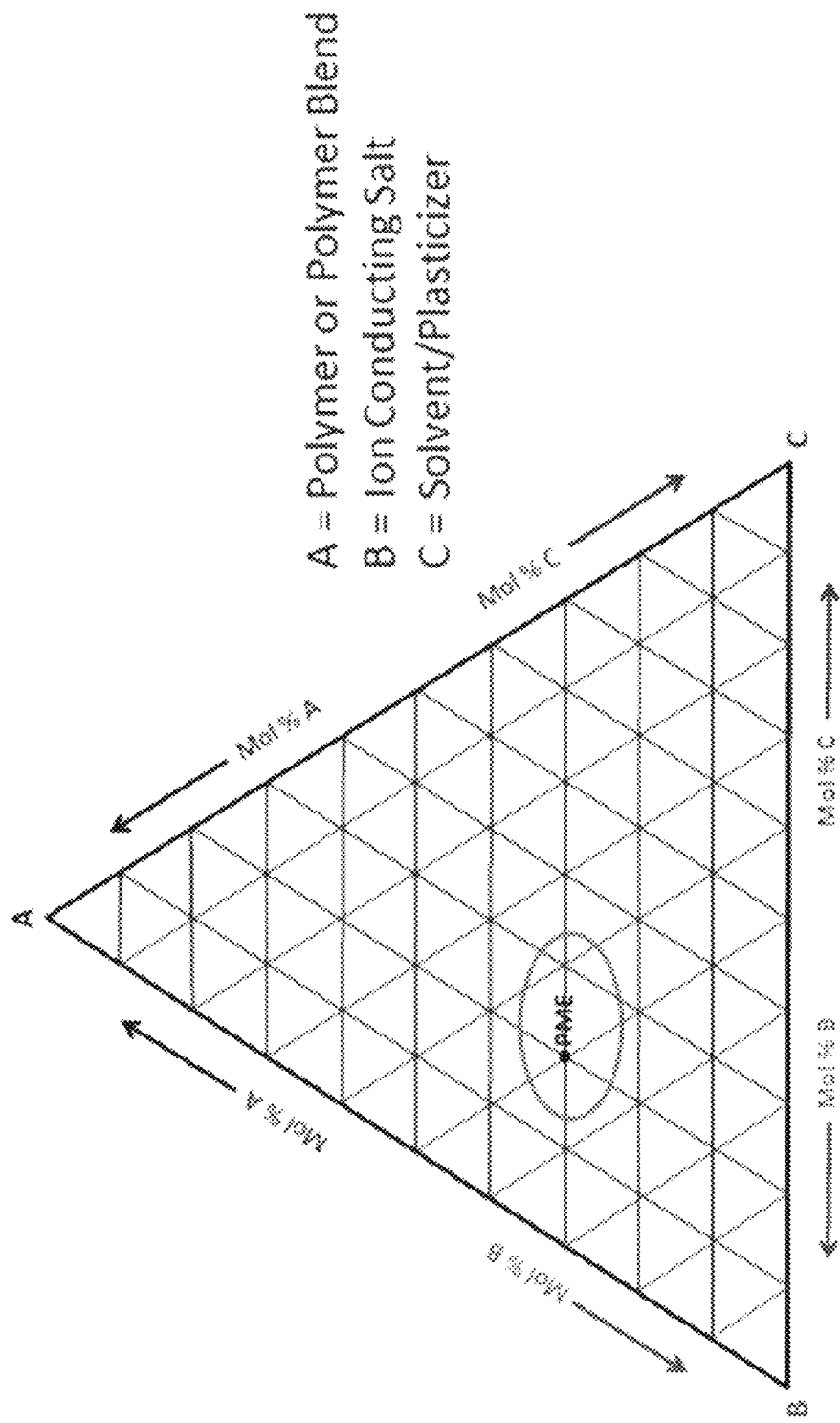
FIG. 1 is a representative schematic illustrating a traditional PME with the corresponding base components.

After reading this description it will become apparent to one skilled in the art how to implement the invention in various alternative embodiments and alternative applications. However, all the various embodiments of the present invention will not be described herein. It will be understood that the embodiments presented here are presented by way of example only, and not limitation. As such, this detailed description of various alternative embodiments should not be construed to limit the scope or breadth of the present invention as set forth below.

As an alternative to convention liquid electrolytes used in lithium ion batteries, it is contemplated that batteries with polymer electrolytes can provide increased safety and reliability to batteries while still maintaining facile manufacturing of the battery.

Provided herein are polymer electrolyte materials comprised of polymer matrix electrolytes (PME) for use as membranes for lithium ion batteries. The PME membranes have low porosity and tortuosity and have high mechanical strength. The PME membrane is formed as a free-standing film or a film on the surface of an electrode through casting and drying of PME precursor solutions disclosed herein. The PME precursor solution is a mixture of polymers, salts, and solvents which may additionally contain plasticizers and other additives to enhance performance and reduce flammability of the cells.

The methods described herein provide polymer electrolytes PMEs membranes with high ionic conductivity, high mechanical strength and wide electrochemical stability windows. These properties of the PMEs membranes are important to both the performance and safety of lithium ion batteries. The PME membranes of the present disclosure are also compatible with the current lithium ion battery production processing and can aid in the development next generation cells that can be produced at a lower manufacturing cost.

Definitions

As used herein, the term "about" when used to modify a numerical value means a value that is within 10% of that numerical value (i.e., +/−10%).

The terms "no" or "substantially no" as used herein with regard to a characteristic of a material or solution mean that the characteristic (e.g., a pores) is present in an amount less than about 0.0001%, less than about 0.001%, less than about 0.01%, less than about 0.1%, less than about 1%, less than about 5%, or less than about 10% of the total mass or volume of the material or solution.

As used herein, the singular forms "a," "an," and "the" include plural referents unless the context clearly dictates otherwise. Thus, for example, reference to "a membrane" includes a plurality of membranes.

As used herein, the term "membrane" is used interchangeable with the terms "film" and "separator."

Methods

Aspects of the present disclosure provides methods of preparing a solid-state polymer matrix electrolyte (PME) and methods for preparing a PME precursor solution for forming the PME.

In some embodiments, the methods comprise (a) preparing a first solution comprising at least one polymer in a solvent; (b) preparing a second solution comprising at least one lithium salt, at least one plasticizer, and a solvent; and (c) mixing the first solution with the second solution to form the PME precursor solution.

In some embodiments, the methods further comprise preparing a third solution comprising at least one lithium salt and one or more additives in a solvent and mixing the third solution with the first and second solution in step (c). In some embodiments, the third solution can help to increase the solubility of the various components of the first, second, and/or resulting precursor solution. For example, in some embodiments, the components of the first and/or second solution are not fully soluble; however, upon the addition of the third solution, the components fully dissolve. In some embodiments, the third solution enables the introduction of one or more additives that can reinforce the conductivity, mechanical strength, non-flammability and other properties of the PME precursor solution.

In some embodiments, the first solution comprises at least one polymer. The polymer forms the backbone of the PME and serves as a matrix in which the other components of the PME are contained. The polymer also provides mechanical strength to the PME. In some embodiments, the first solution comprises at least one, two, three, four, five, or more polymers.

In some embodiments, the mass ratio of the at least one polymer in the first solution to the total mass of the first solution is about 1% to about 60%. In some embodiments the mass ratio the polymer in the first solution to the total mass of the first solution is about 1%, about 5%, about 10%, about 15%, about 20%, about 30%, about 35%, about 40%, about 45%, about 50%, about 55%, or about 60%.

In some embodiments, the mass ratio of the at least one polymer in the PME precursor solution to the total mass of the PME solution is about 1% to about 80%. In some embodiments, the mass ratio of the polymer in the PME precursor solution to the total mass of the PME solution is about 1%, about 5%, about 10%, about 15%, about 20%, about 25%, about 30%, about 35%, about 40%, about 45%, about 50%, about 55%, about 60%, about 64%, about 70%, about 75%, or about 80%.

In some embodiments, the at least one polymer is selected from the group comprising polyvinyl chloride (PVC), GPI-15 polyimide, polyimide, chlorinated polyvinyl chloride (CPVC), polystyrene (PS), polyethylene oxide (PEO), polymethylmethacrylate (PMMA), polyacrylonitrile (PAN), and thermoplastic acrylic resin poly(ethylene oxide) (PEO), poly(propylene oxide) (PPO), poly(acrylonitrile) (PAN), poly(methyl methacrylate) (PMMA), poly(vinyl chloride) (PVC), poly(vinylidene fluoride) (PVdF), poly(vinylidene fluoride-hexafluoro propylene) (PVdF-HFP), polyimide (PI), polyurethane (PET), polyacrylamide (PAA), poly(vinyl acetate) (PVA), polyvinylpyrrollidinone (PVP), Poly(ethylene glycol) diacrylate (PEGDA), polyester, polypropylene (PP), polyethylene napthalate (PEN), polycarbonate (PC), polyphenylene sulfide (PPS), and polytetrafluoroethylene (PTFE).

In some embodiments, the at least one polymer is an ether-based polymer. Non-limiting examples of ether-based polymers include polyethylene oxide, cross-linked polyethylene oxide, polymethacrylate ester-based polymers, and acrylate-based polymers.

In some embodiments, the at least one polymer is a fluorocarbon polymer. Non-limiting examples of fluorocarbon polymers include polyvinylidene fluoride (PVDF) and polyvinylidene-co-hexafluoropropylene (PVDF-HFP).

In some embodiments, the at least one polymer is a polyacrylonitrile. Non-limiting examples of polyacrylonitrile polymers include vinyl acetate, methyl methacrylate, butyl methacylate, methyl acrylate, butyl acrylate, itaconic acid, hydrogenated methyl acrylate, hydrogenated ethyl acrylate, acrlyamide, vinyl chloride, vinylidene fluoride, and vinylidene chloride. In some embodiment, the polymer is selected from polyphenylene sulfide (PPS), poly(p-phenylene oxide) (PPO), liquid crystal polymers (LCPs), polyether ether ketone (PEEK), polyphthalamide (PPA), polypyrrole, polyaniline, and polysulfone.

In some embodiments, the polymer is a copolymer including monomers of the listed polymers and mixtures of these polymers' co-polymer. For example, co-polymers include p-hydroxybenzoic acid can be appropriate liquid crystal polymer base polymers such as poly(vinyl acetal), poly(acrylonitrile), poly(vinyl acetate), polyester (PET), polypropylene (PP), polyethylene napthalate (PEN), polycarbonate (PC), polyphenylene sulfide (PPS), and polytetrafluoroethylene (PTFE).

In some embodiments, the polymer can include other substances that to facilitate the dissociation of the salt in the solution mixture and/or aid in distorting the crystalline nature of the backbone polymer. Distortion of the crystalline nature of the polymer backbone can increase the amorphous characteristics, which in turn aids in improving the conductivity of the PME. Non-limiting examples of the other substances include acrylate, polyethylene oxide (PEO), polypropylene oxide (PPO), poly(bis(methoxy-ethoxy-ethoxide))-phosphazene (MEEP), polyacrylonitrile (PAN), polymethylmethacrylate (PMMA), and polymethyl-acrylonitrile (PMAN).

In some embodiments, the polymer has a basic chemical moiety. In some embodiments, the basic chemical moiety is an amino functional group. In some embodiments, the polymer can include a polyvinyl-series compound and a polyacetylene-series polymer compound. In some embodiments, the polymer comprises a polyimide polymer.

In some embodiments, the first, second, and/or third solution comprises a solvent. The solvent is any solute than can dissolve the various components of the first, second, and third solutions. The solvent also serves as a medium by which the ions can store and release energy within the PME. The solvent further influences the solvated state of the PME. For example, the more apt the solvent is at solvating the various components of the solutions, the higher the solid-state nature of the PME (i.e., there will be less free-flowing solvent in the PME).

In some embodiments, the mass ratio of the solvent in the first, second, and/or third solution to the total mass of the first, second, and/or third solution is about 20% to about 90%. In some embodiments, the mass ratio of the solvent in the first and/or second solution to the total mass of the first and/or second solution is about 20%, about 25%, about 30%, about 35%, about 40%, about 45%, about 50%, about 55%, about 60%, about 65%, about 70%, about 75%, about 80%, about 85%, or about 90%.

In some embodiments, the mass ratio of the solvent in the PME precursor solution to the total mass of the PME precursor solution is about 0% to about 90%. In some embodiments, the mass ratio of the solvent in the PME precursor solution to the total mass of the PME precursor solution is about 20%, about 25%, about 30%, about 35%, about 40%, about 45%, about 50%, about 55%, about 60%, about 65%, about 70%, about 75%, about 80%, about 85%, or about 90%. In some embodiments, the mass ratio of the solvent in the PME precursor solution to the total mass of the PME precursor solution is about 20% to about 90%, about 0% to about 20%, about 20% to about 40%, about 40% to about 60%, about, about 70% to about 90%.

In some embodiments, the solvent is an organic solvent. Non-limiting examples of organic solvents include acetone, N-methylpyrrolidone (NMP), anhydrous ethanol, dimethylacetamide (DMAc), dimethyl sulfoxide (DMSO), dimethylformamide (DMF), tetrahydrofuran (THF), trimethyl phosphate (TMP), triethyl phosphate (TEP), gamma-butyrolactone (GBL), and ethyl acetate. In some embodiments, the solvent comprises organic esters of carbonic acid with the linear or cyclic structure, namely, e.g., dialkyl and alkene carbonates. Non-limiting examples of dialkyl and alkene carbonates solvents include ethylene carbonate (EC), dimethyl carbonate (DMC), diethyl carbonate (DEC), and ethylmethyl carbonate (EMC).

In some embodiments, the second and/or third solution comprises at least one lithium salt. The lithium salt provides the electrochemically actives species for the PME. When dissolved in the solvent, the salt dissociates into the corresponding cations and anions (e.g., for the salt $LiPF_6$, the cations correspond to $Li^+$ and the anions correspond to $PF_6^-$), which are then transported between the electrodes—the location in which reactions take place to store and release energy. Non-limiting examples of lithium salts include lithium hexafluorophosphate ($LiPF_6$), lithium perchlorate ($LiClO_4$), lithium tetrafluoroborate ($LiBF_4$), Lithium bis(trifluoromethanesulfonyl)imide (LiTFSi), Lithium bis(fluorosulfonyl)imide (LiFSI), lithium bis(oxalato)borate (LiBOB), lithium diflouro(oxalato)borate (LiODFB), and lithium carbonate ($Li_2CO_3$), lithium chloride (LiCl), lithium bromide (LiBr), lithium iodide (LiI), lithium tetrafluoroborate ($LiBF_4$), lithium hexafluorophosphate ($LiPF_6$), lithium hexafluoroarsenate ($LiAsF_6$), lithium acetate ($LiCH_3CO_2$), lithium triflate ($LiCF_3SO_3$), lithium bistrifluoromethylsulfonyl imide ($Li(CF_3SO_2)_2N$), lithium trifluoroacetate $Li(CF_3CO_2)$, lithium tetraphenylborate $Li(B(C_6H_5)_4)$, lithium thiocyanate (LiSCN), and lithium nitrate ($LiNO_3$).

In some embodiments, the mass ratio of the lithium salt in the second and/or third solution to the total mass of the second and/or third solution is about 1% to about 50%. In some embodiments, the mass ratio of the lithium salt in the second and/or third solution to the total mass of the second and/or third solution is about 1%, about 5%, about 10%, about 15%, about 20%, about 25%, about 30%, about 35%, about 40%, about 45%, or about 50%. In some embodiments, the mass ratio of the lithium salt in the second solution to the total mass of the second is about 1% to about 50%. In some embodiments, the mass ratio of the lithium salt in the third solution to the total mass of the third is about 1% to about 50%.

In some embodiments, the mass ratio of the lithium salt in the PME precursor solution to the total mass of the PME precursor solution is about 1% to about 99%. In some embodiments, the mass ratio of the lithium salt in the PME precursor solution to the total mass of the PME precursor solution is about 1%, about 5%, about 10%, about 15%, about 20%, about 25%, about 30%, about 35%, about 40%, about 45%, about 50%, about 55%, about 60%, about 65%, about 70%, about 75%, about 80%, about 85%, about 95%, or about 99%. In some embodiments, the mass ratio of the lithium salt in the PME precursor solution to the total mass of the PME precursor solution is about 1% to about 35%, about 2% to about 65%, about 5% to about 85%, or about 6% to about 96%.

In some embodiments, the second solution comprises a plasticizer. In some embodiments, the third solution further comprises a plasticizer. The plasticizer serves to decrease the plasticity and/or decrease the viscosity of the material. The addition of the plasticizer helps to increase the flexibility of the polymeric material. Non-limiting examples of plasticizers include propylene carbonate (PC), ethylene carbonate (EC), 1,4-butyrolactone (GBL), tetraethylene glycol dimethyl ether (TEGDME), diethylcarbamazine (DEC), dimethyl carbonate (DMC), ethyl methyl carbonate (EMC), methyl propyl carbonate (EMP), and ethyl acetate (EA), tetramethylsilane (TMS), TEP, TMP, thiamine pyrophosphate (TPP), and thiocyanate (SCN).

In some embodiments, the mass ratio of the plasticizer in the second solution to the total mass of the second solution is about 1% to about 50%. In some embodiments, the mass ratio of the plasticizer in the second solution to the total mass of the second solution is about 1%, about 5%, about 10%, about 15%, about 20%, about 25%, about 30%, about 35%, about 40%, about 45%, or about 50%.

In some embodiments, the mass ratio of the plasticizer in the third solution to the total mass of the third solution is about 1% to about 60%. In some embodiments, the mass ratio of the plasticizer in the second solution to the total mass of the second solution is about 1%, about 5%, about 10%, about 15%, about 20%, about 25%, about 30%, about 35%, about 40%, about 45%, about 50%, about 55%, or about 60%.

In some embodiments, the mass ratio of the plasticizer in the PME precursor solution to the total mass of the PME precursor solution is about 1% to about 65%. In some embodiments, the mass ratio of the plasticizer in the PME precursor solution to the total mass of the PME precursor solution is about 1%, about 5%, about 10%, about 15%, about 20%, about 25%, about 30%, about 35%, about 40%, about 45%, about 50%, about 55%, about 60%, or about 65%. In some embodiments, the mass ratio of the plasticizer in the PME precursor solution to the total mass of the PME precursor solution is about 0.001% to about 39% or about 2% to about 45%.

In some embodiments, the third solution comprises one or more additives. The additives can reinforce the conductivity, mechanical strength, non-flammability and other properties of the PME precursor solution. Non-limiting examples of additives include an inorganic particle, a flame retardant, surfactant, film former, dissociation agent, and phase separation solution.

In some embodiments, the mass ratio of the one or more additives in the third solution to the total mass of the third solution is about 0% to about 60%. In some embodiments, the mass ratio of the one or more additives in the third solution to the total mass of the third solution is about 0%, 0.0001%, about 0.001%, about 0.01%, about 0.1%, about 1%, about 5%, about 10%, about 15%, about 20%, about 25%, about 30%, about 35%, about 40%, about 45%, about 50%, about 55%, or about 60%.

In some embodiments, the mass ratio of the one or more additives in the PME precursor to the total mass of the PME precursor is about 0% to about 60%. In some embodiments, the mass ratio of the one or more additives in the PME precursor to the total mass of the PME precursor is about 0%, 0.0001%, about 0.001%, about 0.01%, about 0.1%, about 1%, about 5%, about 10%, about 15%, about 20%, about 25%, about 30%, about 35%, about 40%, about 45%, about 50%, about 55%, or about 60%.

In some embodiments, the one or more additives is an inorganic particle. In some embodiments, the inorganic particle is a nanoparticle. The inorganic particle serves to improve the physical characteristics of the PME by distorting the crystalline nature of the backbone polymer, which in turn aids in improving the conductivity of the PME. The particles can further aid in enhancing the mechanical strength and reducing the flammability of the PME. Non-limiting examples of inorganic particles include nano-silica ($SiO_2$), titanium dioxide ($TiO_2$), aluminum oxide ($Al_2O_3$), lithium metaaluminate ($LiAlO_2$), zeolite, lithium nitride ($Li_3N$), and barium titanate ($BaTiO_3$).

In some embodiments, the mass ratio of the inorganic particle in the third solution to the total mass of the third solution is about 0% to about 60%. In some embodiments, the mass ratio of the inorganic particle in the third solution to the total mass of the third solution is about 0%, 0.0001%, about 0.001%, about 0.01%, about 0.1%, about 1%, about 5%, about 10%, about 15%, about 20%, about 25%, about 30%, about 35%, about 40%, about 45%, about 50%, about 55%, or about 60%.

In some embodiments, the mass ratio of the inorganic particle in the PME precursor to the total mass of the PME precursor is about 0% to about 60%. In some embodiments, the mass ratio of the inorganic particle in the PME precursor to the total mass of the PME precursor is about 0%, 0.0001%, about 0.001%, about 0.01%, about 0.1%, about 1%, about 5%, about 10%, about 15%, about 20%, about 25%, about 30%, about 35%, about 40%, about 45%, about 50%, about 55%, or about 60%.

In some embodiments, the one or more additives is a flame retardant. The flame retardants can prevent and/or suppress the further development of ignition and/or fire. Non-limiting examples of flame retardants include TMP, TEP, TPP and tributyl phosphate (TBP), monofluoromethyl ethylene carbonate, and difluoromethyl carbonate. In some embodiments, the amount and type of flame retardant is added to the precursor solution depending on the requirements of the battery design.

In some embodiments, the mass ratio of the flame retardant in the third solution to the total mass of the third solution is about 0% to about 60%. In some embodiments, the mass ratio of the flame retardant in the third solution to the total mass of the third solution is about 0%, 0.0001%, about 0.001%, about 0.01%, about 0.1%, about 1%, about 5%, about 10%, about 15%, about 20%, about 25%, about 30%, about 35%, about 40%, about 45%, about 50%, about 55%, or about 60%.

In some embodiments, the mass ratio of the flame retardant in the PME precursor solution to the total mass of the PME precursor solution is about 0% to about 30%. In some embodiments, the mass ratio of the flame retardant in the PME precursor solution to the total mass of the PME precursor solution is about 0%, 0.0001%, about 0.001%, about 0.01%, about 0.1%, about 1%, about 5%, about 10%, about 15%, about 20%, about 25%, or about 30% In some embodiments, the flame retardant in the PME precursor solution to the total mass of the PME precursor solution is 0.001 to 19.8% or 2 to 30%.

In some embodiments, the one or more additives is a surfactant. The surfactant serves to lower the surface tension of the PME. The surfactant can also serve to facilitate film formation of the PME on electrodes. The surfactant can be an anionic, cationic, zwitterionic, and/or non-ionic surfactant. In some embodiments, the anionic surfactants include those with functional groups such as sulfate, sulfonate, phosphate, and/or carboxylates. Non-limiting examples of anionic surfactants include docusate (dioctyl sodium sulfosuccinate), perfluorooctanesulfonate (PFOS), perfluorobutanesulfonate, alkyl-aryl ether phosphates, and alkyl ether phosphates. In some embodiments, the cationic surfactant is a primary, secondary, or tertiary amine that can become positively charged at a pH<10. Non-limiting examples of cationic surfactants include cetrimonium bromide (CTAB), cetylpyridinium chloride (CPC), benzalkonium chloride (BAC), benzethonium chloride (BZT), dimethyldioctadecylammonium chloride, and dioctadecyldimethylammonium bromide (DODAB). In some embodiments, the zwitterionic surfactant have both cationic and anionic centers. Non-limiting examples of zwitterionic surfactants include phospholipids phosphatidylserine, phosphatidylethanolamine, phosphatidylcholine, sphingomyelins, and betaines. In some embodiments, the surfactant is a non-ionic surfactant with covalently bonded oxygen-containing hydrophilic groups, which are bonded to hydrophobic parent structures. Non-limiting examples of non-ionic surfactants include ethoxylates, fatty alcohol ethoxylates, alkylphenol ethoxylates (e.g., nonoxynols and Triton X-100), fatty acid ethoxylates, ethoxylated amines and/or fatty acid amides, fatty acid esters of polyhydroxy compounds, fatty acid esters of glycerol (e.g., glycerol monostearate and glycerol monolaurate), fatty acid esters of sorbitol (e.g., sorbitan monolaurate, sorbitan monostearate, sorbitan tristearate, tweens: tween 20, tween, 40, tween 60, and tween 80) terminally blocked ethoxylates (e.g., poloxamers), fatty acid esters of sucrose, and alkyl polyglucosides (e.g., decyl glucoside, lauryl glucoside, and octyl glucoside).

In some embodiments, the mass ratio of the surfactant in the third solution to the total mass of the third solution is about 0% to about 60%. In some embodiments, the mass ratio of the surfactant in the third solution to the total mass of the third solution is about 0%, 0.0001%, about 0.001%, about 0.01%, about 0.1%, about 1%, about 5%, about 10%, about 15%, about 20%, about 25%, about 30%, about 35%, about 40%, about 45%, about 50%, about 55%, or about 60%.

In some embodiments, the mass ratio of the surfactant in the PME precursor solution to the total mass of the PME precursor solution is about 0% to about 60%. In some embodiments, the mass ratio of the surfactant in PME precursor solution to the total mass of the PME precursor solution is about 0%, 0.0001%, about 0.001%, about 0.01%, about 0.1%, about 1%, about 5%, about 10%, about 15%, about 20%, about 25%, about 30%, about 35%, about 40%, about 45%, about 50%, about 55%, or about 60%.

In some embodiments, the one or more additives is a film former. Film formers are polymeric materials that can help form a cohesive and continuous film. Film formers can also optimize the surface of materials such that they have optimal adhesion and flexibility properties. Non-limiting examples of film formers include polyvinylpyrrolidone (PVP), acrylates, acrylamides, methacrylates, and various copolymers.

In some embodiments, the mass ratio of the film former in the third solution to the total mass of the third solution is about 0% to about 60%. In some embodiments, the mass ratio of the film former in the third solution to the total mass of the third solution is about 0%, 0.0001%, about 0.001%, about 0.01%, about 0.1%, about 1%, about 5%, about 10%, about 15%, about 20%, about 25%, about 30%, about 35%, about 40%, about 45%, about 50%, about 55%, or about 60%.

In some embodiments, the mass ratio of the film former in the PME precursor solution to the total mass of the PME precursor solution is about 0% to about 60%. In some embodiments, the mass ratio of the film former in the PME precursor solution to the total mass of the PME precursor solution is about 0%, 0.0001%, about 0.001%, about 0.01%, about 0.1%, about 1%, about 5%, about 10%, about 15%, about 20%, about 25%, about 30%, about 35%, about 40%, about 45%, about 50%, about 55%, or about 60%.

In some embodiments, the one or more additives is a dissociation agent. The dissociation agent helps to facilitate the dissociation of the metal ions (e.g., Li metal salts) in solution. Dissociation agents can be any one of the plasticizers and/or solvents as described above.

In some embodiments, the mass ratio of the immobilization and/or dissociation agent in the third solution to the total mass of the third solution is about 0% to about 60%. In some embodiments, the mass ratio of the immobilization and/or dissociation agent in the third solution to the total mass of the third solution is about 0%, 0.0001%, about 0.001%, about 0.01%, about 0.1%, about 1%, about 5%, about 10%, about 15%, about 20%, about 25%, about 30%, about 35%, about 40%, about 45%, about 50%, about 55%, or about 60%.

In some embodiments, the mass ratio of the immobilization and/or dissociation agent in the PME precursor solution to the total mass of the PME precursor solution is about 0% to about 60%. In some embodiments, the mass ratio of the immobilization and/or dissociation agent in the PME precursor solution to the total mass of the PME precursor solution is about 0%, 0.0001%, about 0.001%, about 0.01%, about 0.1%, about 1%, about 5%, about 10%, about 15%, about 20%, about 25%, about 30%, about 35%, about 40%, about 45%, about 50%, about 55%, or about 60%.

In some embodiments, the mass ratio of the phase separation solution in the third solution to the total mass of the third solution is about 0% to about 60%. In some embodiments, the mass ratio of the phase separation solution in the third solution to the total mass of the third solution is about 0%, 0.0001%, about 0.001%, about 0.01%, about 0.1%, about 1%, about 5%, about 10%, about 15%, about 20%, about 25%, about 30%, about 35%, about 40%, about 45%, about 50%, about 55%, or about 60%.

In some embodiments, the mass ratio of the phase separation solution in the PME precursor solution to the total mass of the PME precursor solution is about 0% to about 60%. In some embodiments, the mass ratio of the phase separation solution in the PME precursor solution to the total mass of the PME precursor solution is about 0%, 0.0001%, about 0.001%, about 0.01%, about 0.1%, about 1%, about 5%, about 10%, about 15%, about 20%, about 25%, about 30%, about 35%, about 40%, about 45%, about 50%, about 55%, or about 60%.

In some embodiments, the polymer to salt ratio of the PME precursor solution is between about 10:90 to about 90:10. The polymer to salt ratio is fine-tuned so as to increase the overall mechanical strength of the resulting PME as well as to increase the ion mobility within the PME. The mechanical strength of the PME can be tuned by increasing and/or decreasing the amount of polymer present and the ion mobility is tuned by increasing and/or decreasing the amount of salt present in the PME precursor solution. In some embodiments, the polymer to salt ratio of the PME precursor solution is about 10:90, about 20:80, about 30:70, about 40:60, about 50:50, about 60:40, about 70:30, about 80:20, about 90:10. In some embodiments, the polymer to salt ratio of the PME precursor solution is 60:40. In some embodiments, the polymer to salt ratio of the PME precursor solution is 70:30. In some embodiments, the polymer to salt ratio of the PME precursor solution is 80:20.

In some embodiments, the first, second, and/or third solution are stirred for about 0.5 hours to about 100 hours. In some embodiments, the first, second, and/or third solution are stirred for about 0.5 hours, about 1 hours, about 5 hours, about 10 hours, about 15 hours, about 20 hours, about 25 hours, about 30 hours, about 35 hours, about 40 hours, about 45 hours, about 50 hours, about 55 hours, about 60 hours, about 65 hours, about 70 hours, about 75 hours, about 80 hours, about 85 hours, about 90 hours, about 95 hours, or about 100 hours. In some embodiments, the first solution is stirred for about 0.5 hours to about 100 hours. In some embodiments, the second solution is stirred for about 0.5 hours to about 100 hours. In some embodiments, the third solution is stirred for about 0.5 hours to about 100 hours.

In some embodiments, the first, second, and/or third solution are stirred at a speed of about 100 rpm to about 5000 rpm. In some embodiments, the first, second, and/or third solution are stirred at a speed of about 100 rpm, 500 rpm, 1000 rpm, 2000 rpm, 3000 rpm, 4000 rpm, or 5000 rpm. In some embodiments, the first solution is stirred at a speed of about 100 rpm to about 5000 rpm. In some embodiments, the second solution is stirred at a speed of about 100 rpm to about 5000 rpm. In some embodiments, the third solution is stirred at a speed of about 100 rpm to about 5000 rpm.

In some embodiments, the first, second, and/or third solution are stirred at a temperature between about 10° C. to about 100° C. In some embodiments, the first, second, and/or third solution are stirred at a temperature of about 10° C., about 15° C., about 20° C., about 25° C., about 30° C., about 35° C., about 40° C., about 45° C., about 50° C., about 55° C., about 60° C., about 65° C., about 70° C., about 75° C., about 80° C., about 85° C., about 90° C., about 95° C., or about 100° C. In some embodiments, the first solution is stirred at a temperature between about 10° C. to about 50° C. In some embodiments, the second solution is stirred at a temperature between about 10° C. to about 50° C. In some embodiments, the third solution is stirred at a temperature between about 10° C. to about 50° C.

In some embodiments, the first solution is stirred until the polymer is dissolved in the solvent to form a homogenous solution. In some embodiments, the first solution is stirred at a temperature between about 10° C. to about 100° C., at a speed of about 100 rpm to about 5000 rpm, and for about 0.5 hours to about 100 hours. In some embodiments, the polymer does not dissolve until the addition of the third solution.

In some embodiments, the second solution is stirred until the lithium salt and plasticizer is dissolved in the solvent to form a homogenous solution. In some embodiments, the second solution is stirred at a temperature between about 10° C. to about 100° C., at a speed of about 100 rpm to about 5000 rpm, and for about 0.5 hours to about 100 hours. In some embodiments, the lithium slat and plasticizer does not dissolve until the addition of the third solution.

In some embodiments, the third solution is stirred until the lithium salt and one or more additives are dissolved in the solvent to form a homogenous solution. In some embodiments, the second solution is stirred at a temperature between about 10° C. to about 100° C., at a speed of about 100 rpm to about 5000 rpm, and for about 0.5 hours to about 100 hours.

In some embodiments, the first, second, and/or third solution are stirred together to form the PME precursor for about 0.5 hours to about 100 hours. In some embodiments, the first, second, and/or third solution are stirred together to form the PME precursor for about 0.5 hours, about 1 hours, about 5 hours, about 10 hours, about 15 hours, about 20 hours, about 25 hours, about 30 hours, about 35 hours, about 40 hours, about 45 hours, about 50 hours, about 55 hours, about 60 hours, about 65 hours, about 70 hours, about 75 hours, about 80 hours, about 85 hours, about 90 hours, about 95 hours, or about 100 hours. In some embodiments, the first solution is stirred for about 0.5 hours to about 100 hours. In some embodiments, the second solution is stirred for about 0.5 hours to about 100 hours. In some embodiments, the third solution is stirred for about 0.5 hours to about 100 hours.

In some embodiments, the first, second, and/or third solution are stirred together to form the PME precursor at a speed of about 100 rpm to about 5000 rpm. In some embodiments, first, second, and/or third solution are stirred together to form the PME precursor at a speed of about 100 rpm, 500 rpm, 1000 rpm, 2000 rpm, 3000 rpm, 4000 rpm, or 5000 rpm.

In some embodiments, the first, second, and/or third solution are stirred together to form the PME precursor solution at a temperature between about 10° C. to about 100° C. In some embodiments, the first, second, and/or third solution are stirred to form the PME precursor solution at a temperature of about 10° C., about 15° C., about 20° C., about 25° C., about 30° C., about 35° C., about 40° C., about 45° C., about 50° C., about 55° C., about 60° C., about 65° C., about 70° C., about 75° C., about 80° C., about 85° C., about 90° C., about 95° C., or about 100° C.

In some embodiments, the first, second, and/or third solution are stirred together until each of the components have dissolved in the solvent to form a homogenous solution. A homogenous solution enables the formation of homogeneous PME film when the solution is cast onto a film. For example, if the solution is not homogenous, undissolved solutes could act as boundaries in the film and limit ion mobility. In some embodiments, the first, second, and/or third solution are stirred together to form the PME precursor solution at a temperature between about 10° C. to about 100° C., at a speed of about 100 rpm to about 5000 rpm, and for about 0.5 hours to about 100 hours.

In some embodiments, the first, second, and third solution are combined simultaneously. In some embodiments, the first and second solution are combined and stirred and then, the third solution is combined with the second and first solution. In some embodiments, the first and third solution are combined and stirred and then, the second solution is combined with the third and first solution. In some embodiments, the second and third solution are combined and stirred and then, the first solution is combined with the third and first solution.

In some embodiments, the PME precursor solution is a slurry, wherein one or more of the components in the PME precursor solution are suspended in the solvent.

In some embodiments, the methods for preparing the PME precursor solution comprise preparing a first solution comprising a polymer present in a mass fraction of about 1% to about 60% and a solvent present in a mass fraction of about 20% to about 90% relative to the total mass of the first solution. In some embodiments, the methods further comprise stirring the first solution for about 0.5 to about 100 hours at a speed of about 100 to about 5000 rpm and at a temperature of about 10° C. to about 50° C. until the polymer is homogenously dispersed throughout the first solution.

In some embodiments, the methods for preparing the PME precursor solution comprise preparing a second solution comprising a lithium salt present in a mass fraction of about 1% to about 50%, a plasticizer present in a mass fraction of about 1% to about 60%, and one or more additives present in a mass faction of about 1% to about 50% of the total mass of the second solution. In some embodiments, the methods further comprise stirring the second solution for about 0.5 to about 100 hours at a speed of about 100 to about 5000 rpm and at a temperature of about 10° C. to about 50° C. until the lithium salt, plasticizer, and one or more additives is homogenously dispersed throughout the second solution.

In some embodiments, the methods for preparing the PME precursor solution comprise preparing a third solution comprising a lithium salt present in a mass fraction of about 1% to about 50%, a plasticizer present in a mass fraction of about 1% to about 60%, and one or more additives present in a mass faction of about 1% to about 50% of the total mass of the third solution. In some embodiments, the methods further comprise stirring the third solution for about 0.5 to about 100 hours at a speed of about 100 to about 5000 rpm and at a temperature of about 10° C. to about 50° C. until the lithium salt, plasticizer, and one or more additives is homogenously dispersed throughout the second solution.

In some embodiments, the methods of preparing the PME precursor solution comprise stirring the first, second, and third solution for about 0.5 to about 100 hours at a speed of about 100 to about 5000 rpm and at a temperature of about 10° C. to about 50° C. until each of the components are homogenously dispersed throughout the PME precursor solution. In some embodiments, the PME precursor solution comprises a polymer in a mass fraction of about 1% to about 60%, a lithium salt in a mass fraction of about 1% to about 50%, an organic solvent in a mass fraction of about 20% to about 90%, a plasticizer in a mass fraction of about 1% to about 60%, inorganic particles in a mass fraction of about 0% to about 40%, a flame retardant in a mass fraction of about 0% to about 20%, a film formed in a mass fraction of about 0 to about 20%, a surfactant in an amount of about 0% to about 50%, a dissociation agent in a mass fraction of about 0% to about 40%, and/or a phase separation agent in a mass fraction of about 0% to about 50% of the total mass of the PME precursor solution.

In some embodiments, the methods further comprising forming a PME membrane from the PME precursor solution. In some embodiments, the methods comprise (a) preparing the PME precursor solution; and (b) dry casting the precursor solution onto a substrate to form the PME membrane.

In some embodiments, the PME membrane can be formed by casting a film of the PME solution. The PME film can be cast using standard thin film methodology, such as spin casting or using a doctor blade to draw down the solution to a film ranging from about 5 μm to about 100 μm in thickness. Non limiting examples of coating techniques include vapor deposition, dip coating, spin coating, screen coating, and coating with a brush.

In some embodiments, the PME precursor solution is cast onto a substrate with properties that allow the resulting PME film to be removed (e.g., peeled) from the substrate to form a free-standing PME film. The free-standing PME film can be used, for example, as a separator in a battery cell. In some embodiments, the substrates are non-porous to enable the PME to be removed (e.g., peeled) from the substrate. Non-limiting examples of suitable substrates include Mylar, Teflon (PTFE), silicone-coated polyethylene (PE), and polypropylene (PP).

In some embodiments, the PME precursor solution is cast onto a substrate that is a dense but porous electrode with properties that do not permit the PME film to be removed (e.g., peeled) from the substrate. Due to the porosity of the substrate, the PME precursor solution interpenetrates the substrate to form continuity with the surface of the substrate. Non-limiting examples of dense but porous electrodes include anodes used in lithium ion batteries selected from the group consisting of graphite, silicone-graphite, and $SiO_x$ and/or cathodes used in lithium ion batteries selected from the group comprising lithium iron phosphate (LFP), lithium nickel cobalt magnesium oxide (NMC), lithium nickel magnesium spinel (LNMO), lithium nickel cobalt aluminum oxide (NCA), lithium manganese oxide (LMO), and lithium cobalt oxide (LCO).

In some embodiments, the substrate is an electrode or dielectric film and the PME precursor solution is dry cast onto the surface of the electrode or dielectric film for use in an electrochemical cell.

In some embodiments, the PME precursor solution is dry casted onto the substrate at about 10° C., about 15° C., about 20° C., about 25° C., about 30° C., about 35° C., about 40° C., about 45° C., about 50° C., about 55° C., about 60° C., or about 65° C.

In some embodiments, the PME precursor solution homogenously coats the surface of the substrate. In some embodiments, the PME precursor solution is a slurry that coats the surface of the substrate.

In some embodiments, the PME membrane is dried using any method known to those skilled in the art. Non-limiting drying methods include drying in an oven and/or drying the PME membrane under reduced pressure (e.g., under vacuum). Non-limiting examples of ovens suitable for drying the PME membrane include vacuum, convection, laminar flow, and fluidized beds ovens. In some embodiments, the methods comprise placing the PME membrane in the oven at a temperature of about 40° C. to about 80° C. In some embodiments, the methods comprise placing the PME membrane in the oven at a temperature of about 40° C., about 45° C., about 50° C., about 55° C., about 60° C., about 65° C., about 70° C., about 75° C., or to about 80° C.

In some embodiments, the methods comprise placing the PME membrane in the oven for about 5 min to about 120 min. In some embodiments, the methods comprise placing the PME membrane in the oven for about 5 min, about 10 min, about 15 min, about 20 min, about 25 min, about 30 min, about 35 min, about 40 min, about 45 min, about 50 min, about 55 min, about 60 min, about 65 min, about 70 min, about 75 min, about 80 min, about 85 min, about 90 min, about 95 min, about 100 min, about 110 min, about 115 min, or about 120 min.

In some embodiments, the methods comprise placing the PME membrane in the oven at a temperature of about 40° C. to about 80° C. for about 5 min to about 120 min. In some embodiments, the PME membrane is dried in an oven at about 50° C. to about 80° C. for about 20 min to about 60 min. In some embodiments, the PME membrane is dried in an oven at about 80° C. for about 30 min to 60 min. In some embodiments, the PME membrane is dried in an oven at about 40° C. to 80° C. for about 30 min to 60 min.

In some embodiments, the methods comprise preparing the PME membrane on a surface of a substrate by a batch process. A batch process refers to a process of preparing the PME membrane in which the PME precursor is delivered in discrete amounts, rather than continuously. The batch process can enable the production of the PME membrane on a substrate having a large surface area.

In some embodiments, the batch process of preparing the PME membrane includes casting and drying the PME precursor solution onto the surface of the substrate. In some embodiments, the substrate is placed on a slip table prior to casting and drying the PME precursor solution onto the surface of the substrate, wherein the slip table holds the substrate in place during the processing steps. In some embodiments, the dry casting step is performed with a doctor blade. The doctor blade is a device used in the production of thin films on large surface areas. In the doctor blading process, the PME substrate is placed on a substrate beyond the doctor blade. When a constant relative movement is established between the blade and the substrate, the PME substrate spreads on the substrate to form a layer of the PME precursor solution. In some embodiments, the PME precursor solution is poured into a solution chamber of the doctor blade and is casted onto the film at a constant speed. In some embodiments, the substrate is mylar.

In some embodiments, the methods comprise preparing a PME membrane comprising (a) providing a substrate on a slip table; (b) pouring a PME precursor solution into a solution chamber of a doctor blade; (c) casting the PME precursor solution on to the substrate at a constant speed; and (d) placing the coated substrate in an oven at about 80° C. for about 5 min to about 120 min. In some embodiments, the methods further comprise removing the PME film from the substrate to form a free-standing film. In some embodiments, the substrate is mylar.

In some embodiments, the methods comprise preparing a free-standing PME membrane, comprising the steps of (a) preparing a PME precursor solution and (b) dry casting the PME precursor solution onto a substrate to form the PME membrane. In some embodiments, the PME precursor solution comprises a mass ratio of a polymer of about 1 to about 60%; a mass ratio of an organic solvent of about 20% to about 90%; a mass ratio of a lithium salt about 1% to about 60%; a mass ratio of a plasticizer of about 0.5% to about 60%; and mass ratio of one or more additives of about 0.5% to about 60% to the total mass of the PME precursor solution.

In some embodiments, the methods comprise preparing a PME membrane on a surface of an electrode for use in an electrochemical cell, comprising (a) preparing a PME precursor solution and (b) dry casting the PME precursor solution onto the surface of the electrode. In some embodiments, the PME precursor solution comprises a mass ratio of a polymer of about 1% to about 60%; a mass ratio of an organic solvent of about 20% to about 90%; a mass ratio of a lithium salt about 1% to about 60%; a mass ratio of a plasticizer of about 0.5% to about 60%; and mass ratio of one or more additives of about 0.5% to about 60% to the total mass of the PME precursor solution.

In some embodiments, the methods further comprise cross-linking the PME film. Cross-linking the PME film have enhance the PME properties of the film. Non-limiting methods for cross-linking include UV curing with photo-initiators and crosslinkers, thermal cross-linking (e.g., chemical reactions at desired temperatures), and cross-polymerization (e.g., chemical reaction). In some embodiments, the methods comprise cross-linking the PME film in the solvated state after the PME film has been dried. The solvated state of the PME film refers to the PME film, post-drying, wherein some of the solvent has reacted with the polymer and/or salt, forming a solid material comprised of the three components (e.g., solvent, polymer, and salt). When the resulting film contains these three components in the solid form, it is referred to as being in the solvated state.

In some embodiments, the methods are performed under an inert atmosphere. Preparing the PME and/or PME precursor solution under inert conditions prevents unwanted reactivity with deleterious reactivity chemicals found in the atmosphere (e.g., $O_2$ and moisture).

In some embodiments, the methods are performed under anhydrous conditions. Lithium metal salts are hygroscopic so to avoid unwanted reactivity with water, the methods are performed under conditions devoid of moisture. In some embodiments, the methods are performed under anhydrous conditions but not under inert atmosphere conditions. For example, in some embodiments the methods are performed in the presence of oxygen but not water.

Polymer Matrix Electrolyte Membrane

Aspects of the present disclosure provides solid-state polymer matrix electrolyte (PME) membranes.

In some embodiments, the PME membrane has no or substantially no pores. Minimizing the number of pores in the PME membrane prevents the growth of dendrites (e.g., needle-like projections) that form when lithium ions within the battery begin to nucleate and form dendrites-like particles. The dendrites can pierce the structure of the PME membrane causing the battery to short circuit, fail, or even catch on fire. In some embodiments, the PME has no or substantially no pores that extend from one end of the membrane to the other. In some embodiments, there are no porous channels in the PME membrane.

In some embodiments, the pore size is uniform, and the pores are evenly distributed throughout the PME membrane. Uniform and evenly distributed pores enable even flow of current density throughout the PME membrane which can increase the lifetime of the battery.

In some embodiments, the PME membrane has a dense structure. Increasing the density of the PME membrane can also serve to prevent the growth of deleterious lithium dendrites that can cause the battery to short circuit, fail, or even catch on fire. In some embodiments, the PME membrane has a density of about 1 g/cc to about 5 g/cc. In some embodiments, the PME membrane has a density of about 1.4 g/cc to about 1.8 g/cc, about 1 g/cc to about 2 g/cc, about 1 g/cc to about 4 g/cc, about 2 g/cc to about 3 g/cc, about 3 g/cc to about 5 g/cc, or about 1 g/cc to about 3 g/cc.

In some embodiments, the PME membrane has a thickness of about 5 μm to about 100 μm. Film thickness prevents shorting circuiting between the electrodes and prevents dendrites from penetrating through the PME film. The desired thickness of the films can depend on the mechanical strength of the film. For example, the stronger the film, a thinner film that will be required, Conversely, the weaker the film, a thicker film will be required. In some embodiments, the PME membrane has a thickness of about 5 μm, about 10 μm, about 15 μm, about 20 μm, about 25 μm, about 30 μm, about 35 μm, about 40 μm, about 45 μm, about 50 μm, about 55 μm, about 60 μm, about 65 μm, about 70 μm, about 75 μm, about 80 μm, about 85 μm, about 90 μm, about 95 μm, or about 100 μm.

In some embodiments, the PME membrane is stable up to a temperature of about 100° C. Stability at temperatures as high as 100° C. allows for the reliable use of the PME membrane for high temperature battery applications. Non-limiting examples of high temperature battery applications include industrially applications and applications related to the oil and gas industry. In some embodiments, the PME membrane is stable at a temperature of about 25° C., about 30° C., about 35° C., about 40° C., about 45° C., about 50° C., about 55° C., about 60° C., about 65° C., about 70° C., about 75° C., about 80° C., about 85° C., about 90° C., or about 100° C. In some embodiments, the batteries comprised of the PME membrane can operate at a temperature of up to about 100° C.

In some embodiments, the PME membrane has a high mechanical strength. The mechanical strength of the PME membrane can be assessed by the storage modulus (E') and the loss modulus (E") of the PME membrane. The storage modulus is a measure of the energy stored in the elastic structure of the PME membrane whereas the loss modulus is a measure of the amount of energy dissipated in the PME membrane. If the storage modulus is higher than the loss modulus, the material is considered to be elastic and have a high mechanical strength. In some embodiments, the PME membrane has a storage modulus of about $1 \times 10^{10}$ Pa, about $1 \times 10^9$ Pa, about $1 \times 10^8$ Pa, $1 \times 10^7$ Pa, or about $1 \times 10^6$ Pa. In some embodiments, the PME membrane has a storage modulus of $3.33 \times 10^8$ pascals (Pa) and a loss modulus of $2.82 \times 10^7$ Pa at 20° C. In some embodiments, the PME membrane has a loss modulus of about $1 \times 10^{10}$ Pa, about $1 \times 10^9$ Pa, about $1 \times 10^8$ Pa, $1 \times 10^7$ Pa, or about $1 \times 10^6$ Pa. In another embodiment, the PME membrane has a storage modulus of $9.58 \times 10^7$ Pa and a loss modulus of $1.38 \times 10^7$ Pa at 100° C.

In some embodiments, the PME membrane is stable at low voltages. Stability at a low voltage makes the PME membranes suitable for applications to include, but not limited to, lithium cells, batteries, electrochemical capacitors, and fuel cells. In some embodiments, the PME is stable at low voltages between about −0.5 volts (V) to about 2 V vs Li/Li$^+$ reference electrode. In some embodiments, the PME membrane is stable at about −0.5 V, about −0.4 V, about −0.3 V, about −0.2 V, about −0.1 V, about 0 V, about 0.1 V, about 0.2 V, about 0.3 V, about 0.4 V, about 0.5 V, about 0.6 V, about 0.7 V, about 0.8 V, about 0.9 V, about 1 V, about 1.1 V, about 1.2 V, about 1.3 V, about 1.4 V, about 1.5 V, about 1.6 V, about 1.7 V, about 1.8 V, about 1.9 V, or about 2.0 V vs Li/Li$^+$ reference electrode. In some embodiments, the PME membrane is stable at about 0 V vs Li/Li$^+$ reference electrode. In some embodiments, the PME membrane is stable at about −0.5 V vs Li/Li$^+$ reference electrode.

In some embodiments, the PME membrane is stable at high voltages. Stability at a high voltage makes the PME membranes suitable for applications to include, but not limited to, lithium cells, batteries, electrochemical capacitors, and fuel cells. In some embodiments, the PME is stable at low voltages between about 3 volts (V) to about 6 V vs Li/Li$^+$ reference electrode. In some embodiments, the PME membrane is stable at about 3 V, about 3.1 V, about 3.2 V, about 3.3 V, about 3.4 V, about 3.5 V, about 3.6 V, about 3.7 V, about 3.8 V, about 3.9 V, about 4 V, about 4.1 V, about 4.2 V, about 4.3 V, about 4.4 V, about 4.5 V, about 4.6 V, about 4.7 V, about 4.8 V, about 4.9 V, about 5 V, about 5.1 V, about 5.2 V, about 5.3 V, about 5.6 V, about 5.7 V, about 5.8 V, about 5.9 V, or about 6 V vs Li/Li$^+$ reference electrode. In some embodiments, the PME membrane is stable at about 3.4 V vs Li/Li$^+$ reference electrode.

In some embodiments, the PME membrane is stable at low voltages and high voltages. Stability at both low voltage and high voltage is useful for applications to include, but not limited to, lithium cells, batteries, electrochemical capacitors, and fuel cells. In some embodiments, the PME membrane is stable at about −0.5 V to about 6 v vs Li/Li$^+$ reference electrode. In some embodiments, the PME membrane is stable at about −0.5 V to about 4 V, about 0 V to about 5 V, about 0 V to about 4 V, about 0 to about 3V, about 1 v to about 6 V, about 2 V to about 6 V, about 3 V to about 6 V, about 4 V to about 6 V, or about 5 V to about 6 V vs Li/Li$^+$ reference electrode.

In some embodiments, the PME membrane is ionically conducting over a wide temperature range. In some embodiments, the PME membrane is ionically conducting between about −20° C. to about 100° C. In some embodiments, the PME membrane is ionically conducting at about −20° C., about −15° C., about −10° C., about −5° C., about 0° C., about 5° C., about 10° C., about 15° C., about 20° C., about 25° C., about 30° C., about 35° C., about 40° C., about 45° C., about 50° C., about 55° C., about 60° C., about 65° C., about 70° C., about 75° C., about 80° C., about 85° C., about 90° C., about 95° C., or about 100° C.

In some embodiments, the PME membrane is a free-standing film. The free-standing film provides a means for salient characterization of the film properties and can also be used as a separator during cell assembly.

In other embodiments, the PME membrane is applied onto an electrode for use in an electrochemical cell. In some embodiments, the PME can be used in an electrochemical cell and function as a separator and an electrolyte. Separators allow for the physical separation of the anode and the cathode in the battery, enabling the ions within the electrolyte to flow between the two electrodes while preventing short-circuiting.

In some embodiments, the PME membrane can be used as a binder component in an electrochemical cell. The binder component in an electrochemical cell is responsible for holding the active materials within the electrode of the battery to maintain a strong connection between the electrode and the contacts.

In some embodiments, the PME membrane can be used in a storage cell. In some embodiments, the PME membrane can be used in a primary (non-rechargeable battery). In some embodiments, the PME membrane can be used in a secondary (rechargeable battery). In some embodiments, the PME membrane can used in an electrochemical capacitor for example, but not limited to, lithium batteries, Ni/M-H batteries, carbon double layer and storage capacitors.

In some embodiments, the PME can be used in conversion fuel cells to include metal/air batteries.

While the foregoing specification teaches the principles of the present invention, with examples provided for the purpose of illustration, it will be appreciated by one skilled in the art from reading the above disclosure that various changes in form and detail can be made without departing from the true scope of the invention.

EXAMPLE 1

Methods for Preparing PME

The following example relates to methods of preparing PMEs membranes that can be used in lithium ion batteries as an energy storage device.

This study demonstrates the potential to replace traditional polymer electrolytes with PMEs to generate lithium ion batteries with improved performance and safety features. As compared to the traditional polymer materials used in lithium batteries, the PMEs have a higher ionic conductivity, mechanical strength and a wider electrochemical stability windows and are compatible with the current lithium ion battery production processes. Accordingly, this study suggests that safer, next generation cells can be produced at a lower manufacturing costs with use of the PMEs and PME precursor solutions.

Methods of Preparing PME Precursor Solution

The initial step for towards forming the PME involves the preparation of a PME precursor solution. The precursor solution is formed by two solutions (mixtures A and B) and a third, optional solution (mixture C).

Mixture A includes a polymer or polymer bead and a solvent, which can be any organic solvent. Mixture B includes a lithium salt, an optional plasticizer, and/or other additive. Lastly, optional mixture C further includes a lithium salt and one or more additional additives as needed, e.g., a flame retardant. FIG. 1 is a schematic depicting the PME composition with each of the base components (e.g., polymer, ion conducting salt, and solvent/plasticizer).

In this exemplary embodiment, mixture A includes the following: 20%, by mass fraction, PVDF and 80%, by mass fraction, DMAc; mixture B includes 33%, by mass fraction, LiTFSI and 67%, by mass fraction, the solvent DMAc. Lastly, mixture C includes the following: 7%, by mass fraction, LiBOB and 93%, by mass fraction, DMAc. Table 1 enumerates the components for the exemplary embodiment of mixtures A, B, and C.

TABLE 1

Mixture Components for Preparing the PME Precursor

| Mixture | Component | Mass Fraction (%) |
|---|---|---|
| Mixture A | PVDF | 20% |
| | DMAc | 80% |
| Mixture B | LiTFSI | 33% |
| | DMAc | 67% |
| Mixture C | LiBOB | 7% |
| | DMAc | 93% |

Each of the liquid mixtures A, B and C are then mixed, separately, to form homogenous solutions in which each of the components are completely dissolved in the DMAc solvent. The solutions are then combined and stirred at a rotational speed of 500 rpm at a temperature of 25° C. for 24 hours to form the PME precursor solution. The final precursor composition for this exemplary embodiment has polymer-to-total salt weight ratio is 60:40.

Characterization of the PME Film

The next step includes forming the PME film by casting the PME precursor solution onto a dielectric substrate and then removing (e.g., peeling) the PME film from the substrate to characterize the properties of the resulting film.

In a batch process, the dielectric substrate is first cut into a desired size, and after cleaning, the PME precursor solution is homogenously coated onto the substrate. The coating process is carried out at room temperature under dry room conditions and the coated substrate is then heated at 80° C. for 30 minutes. PME film had a resulting thickness between 10 μm-150 μm. The PME membrane was the peeled from the substrate for further characterization.

Figure 2A:
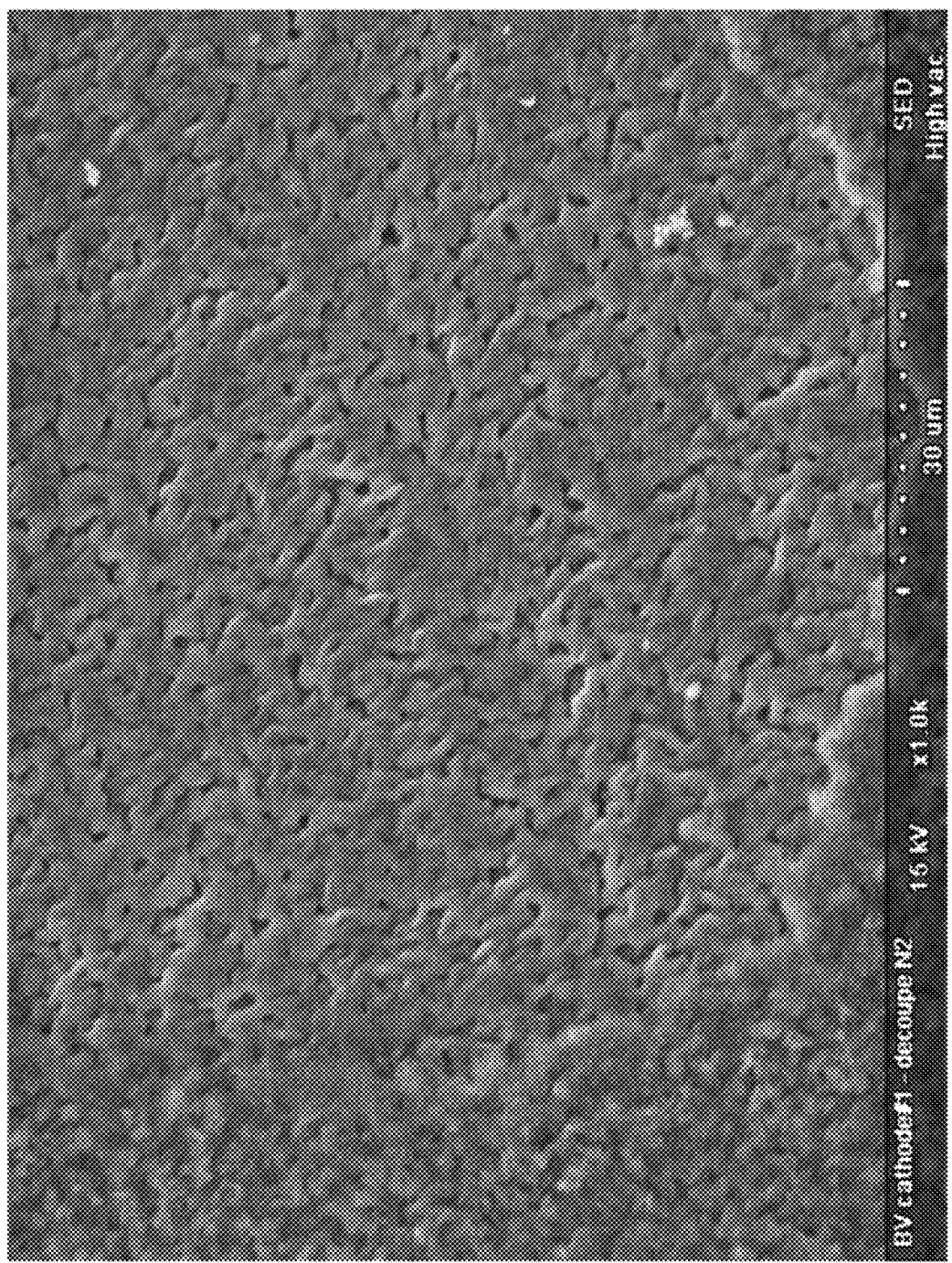
FIGS. 2A-2C are representative SEM images of the top-side of the PME away from the substrate (FIG. 2A), bottom side of the PME on the substrate (FIG. 2B), and a photographic image of the PME after it has been removed (e.g., peeled) from a mylar dielectric substrate (FIG. 2C).
Figure 2B:
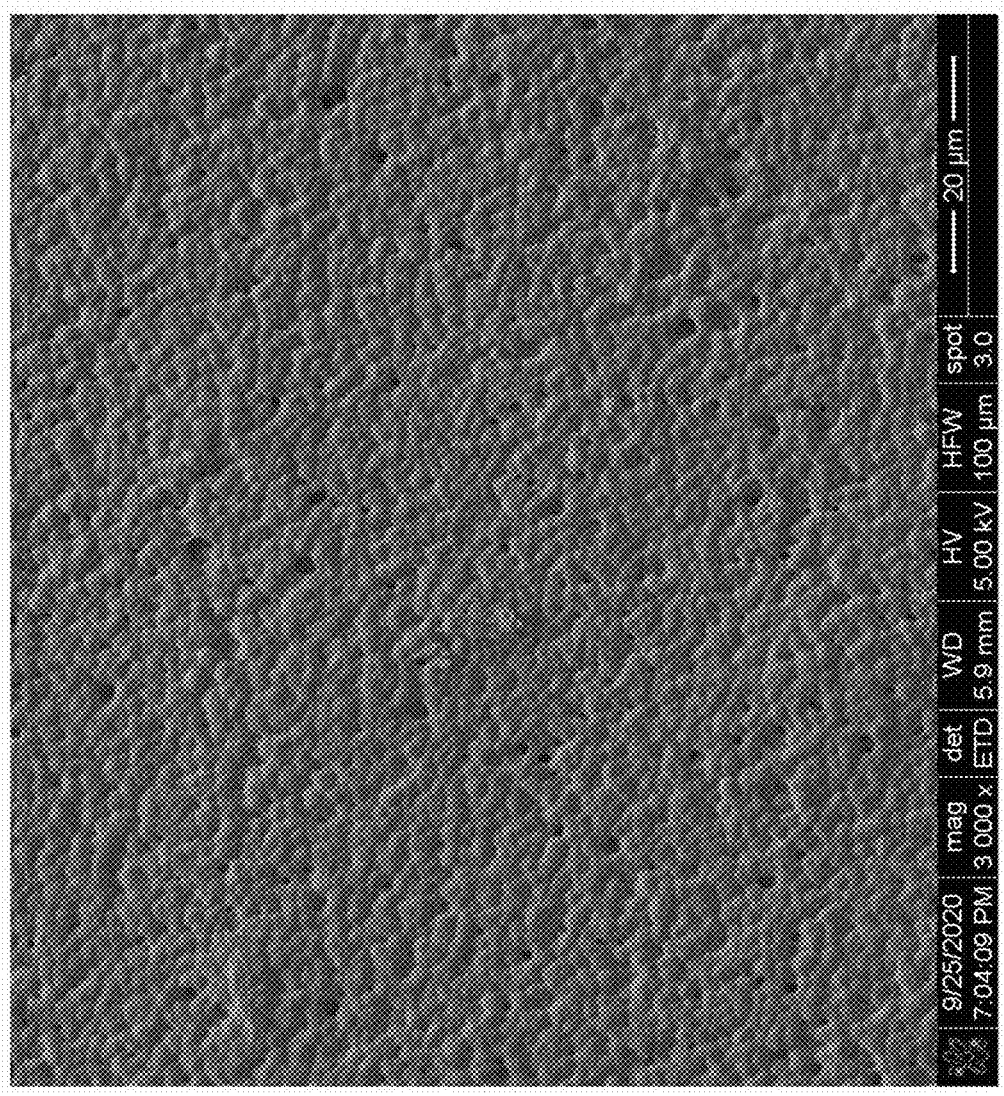
Figure 2C:
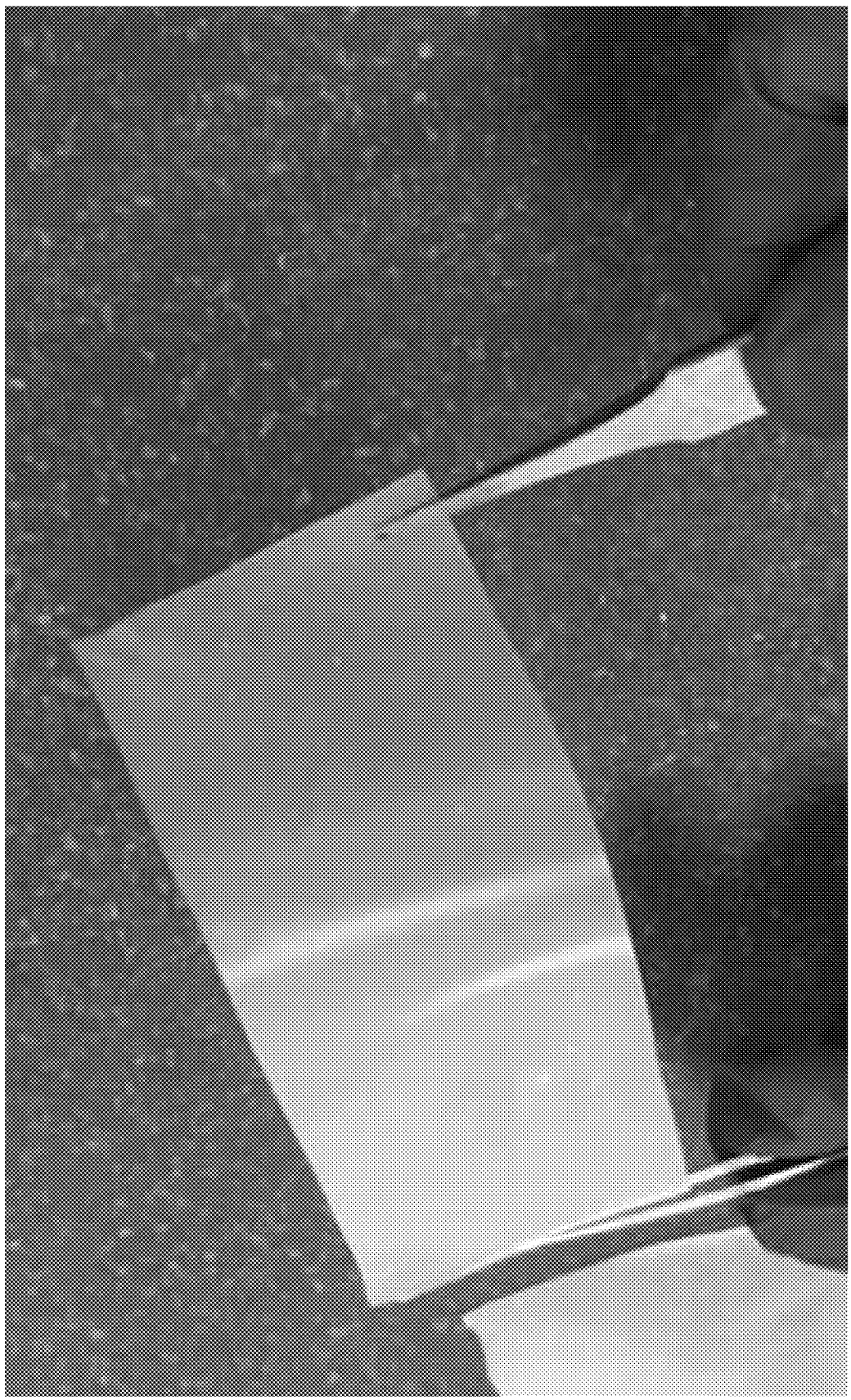

Physical Appearance: SEM images and photographs of the PME film were taken to assess the physical appearance of the resulting PME film. (FIGS. 2A-2C). The PME film was dense with little or no tortuosity, consistent with the properties required for a separator in an electrochemical cell to prevent short circuiting between the negative and positive electrodes in the cell. The side of the PME film towards the dielectric substrate appear denser than the other side. (FIG. 2A (away for the substrate, FIG. 2B (directly on the substrate) and FIG. 2C (image of the PME film)). It is contemplated that this difference is due to the drying gradient from bottom to top of the film.

Figure 3:
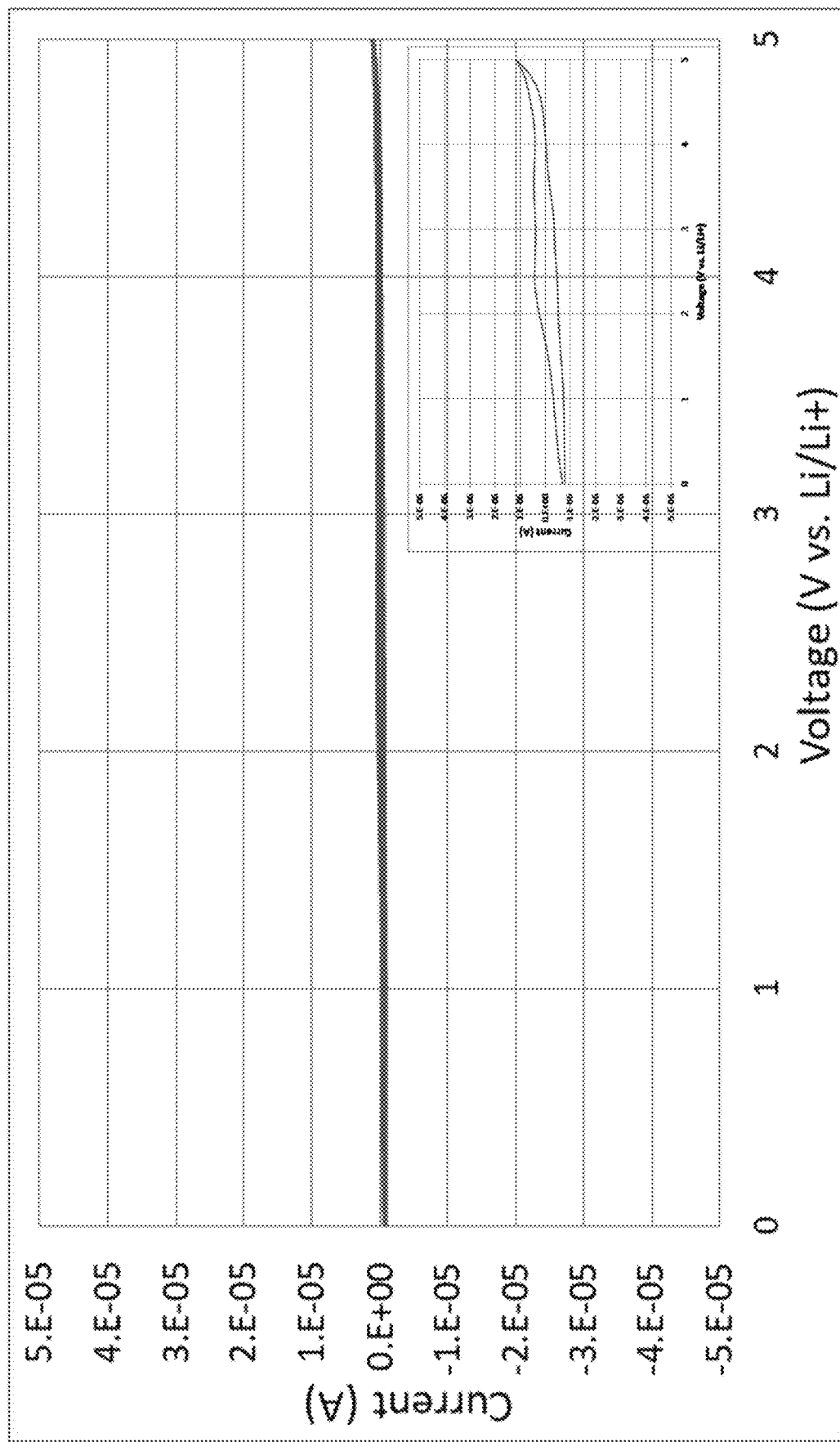
FIG. 3 is a representative cyclic voltammogram of the PME film according to the present disclosure for lithium-ion and lithium-metal electrochemical cells.

Electrochemical Stability: The electrochemical stability of the PME film was measured by cyclic voltammetry. (FIG. 3). The cell configuration for the cyclic voltammetry was as follows: SS/PME/Li and a scan rate of 1 mV/s. The results from the stability analysis show that the PME is stable at both low voltages (close to 0V vs Li/Li+) used with low potential anode materials and high voltages (up to 4.3V vs Li/Li+) used with high potential cathode materials.

Figure 4:
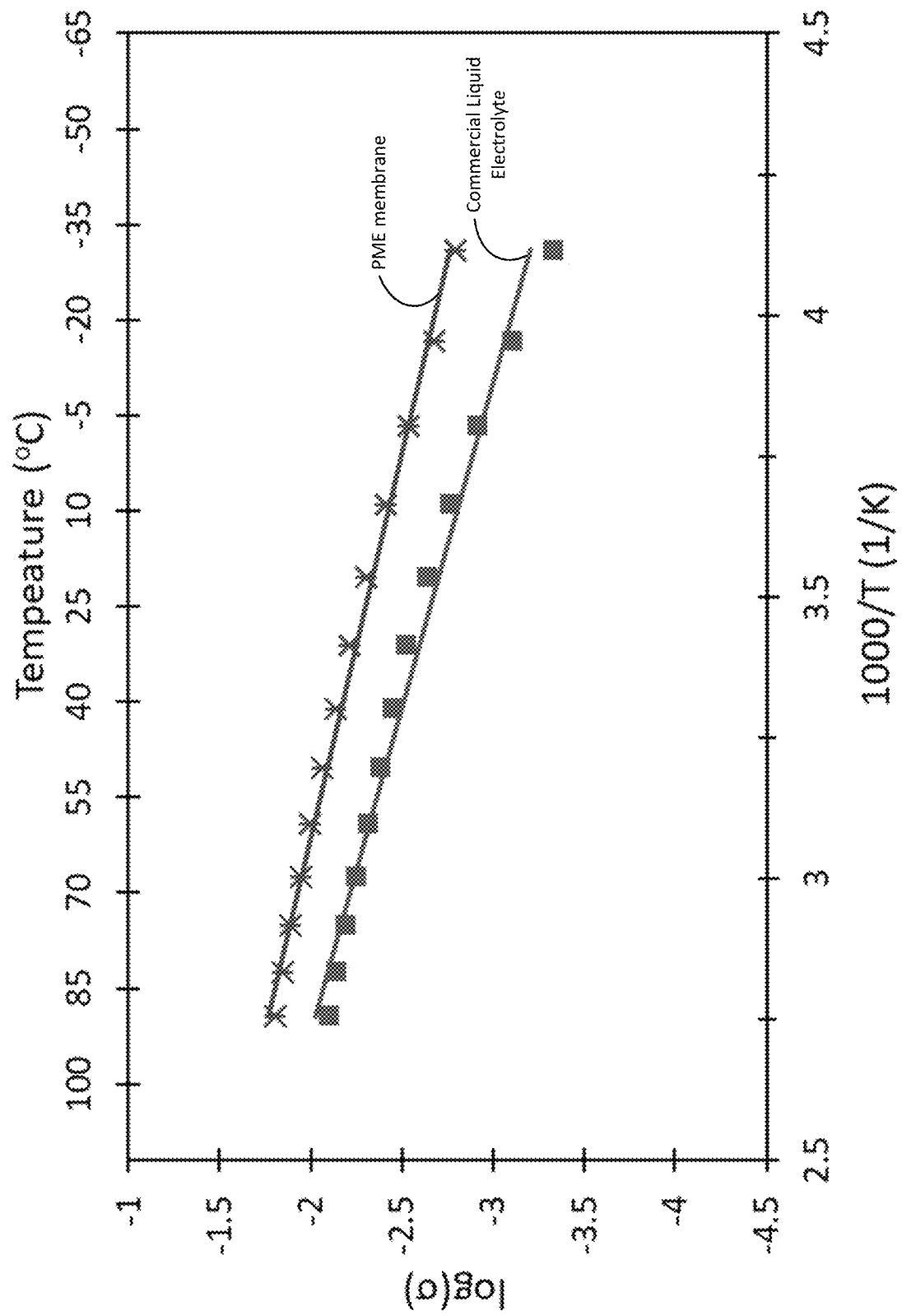
FIG. 4 is a representative graph comparing the ionic conductivities of a PME membrane (top trace) according to an embodiment of the present disclosure and a commercial liquid electrolyte (bottom trace).

Ion Conductivity: The ionic conductivity of PME film was measured over a wide temperature range from −20° C. to +80° C. with 10 mV AC perturbation and 100 kHz-1 Hz EIS scan. (FIG. 4). The data show conductivities for the PME film within the same order of magnitude as liquid electrolytes used in conventional lithium-ion batteries.

Figure 5:
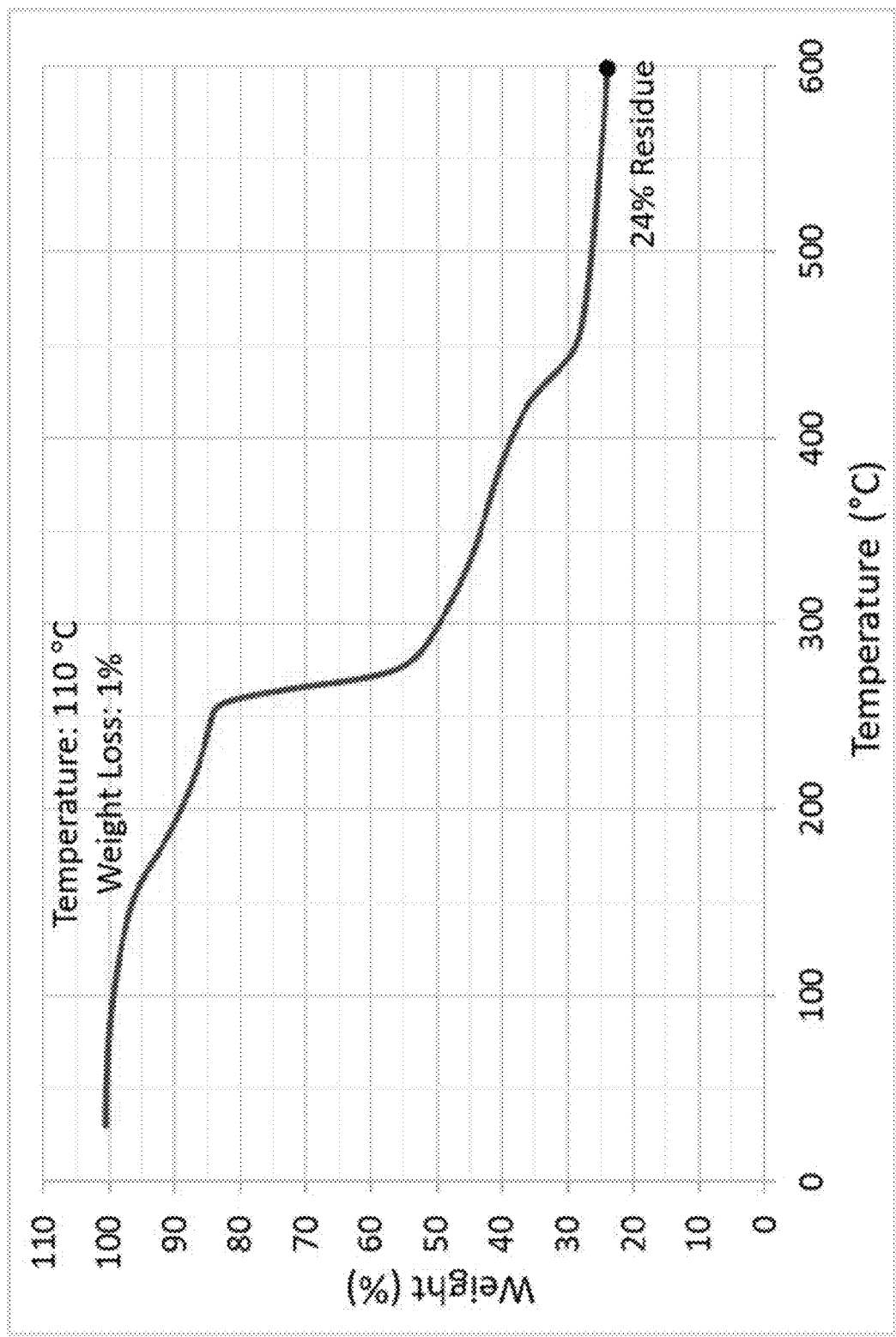
FIG. 5 is a representative thermogravimetric scan of the lithium-ion conducting PME membrane according to an embodiment of the present disclosure.

Thermal Stability: The stability of the PME film at elevated temperatures (e.g., 100° C.) was measured by thermogravimetric analysis (TGA). (FIG. 5). The TGA scan depicts a weight loss of less than 1% up to a temperature of 100° C. indicating that the PME film is stable at this temperature and thus, can be used in cells operating at temperatures up to at least 100° C. without losing its structural integrity.

Figure 6:
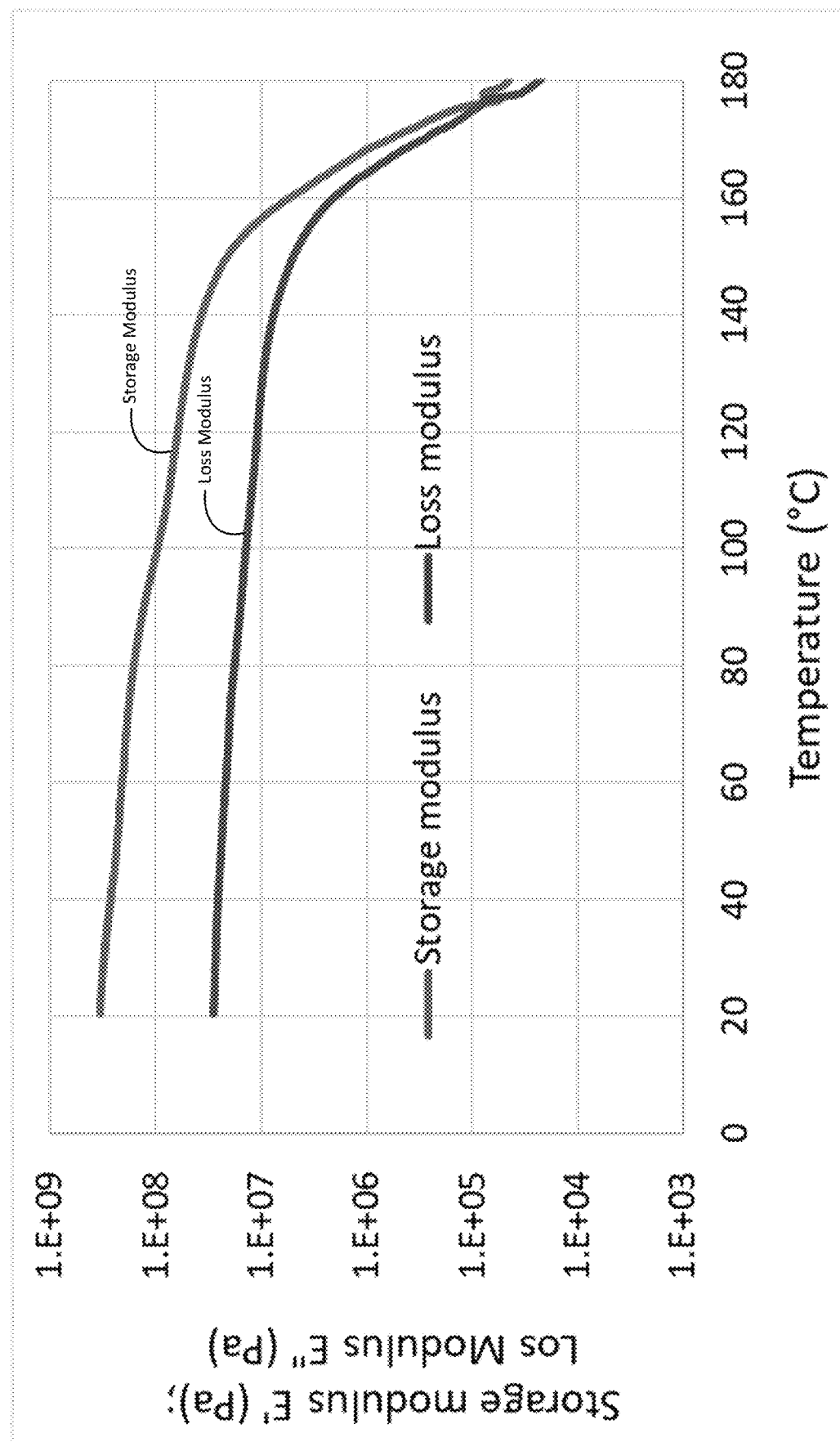
FIG. 6 is a representative graph depicting a dynamic mechanical analysis (DMA) temperature scan of the PME membrane according to an embodiment of the present disclosure.

Mechanical Strength: Dynamic mechanical analysis (DMA) temperature scan with single frequency/strain was used to obtain the Young's modulus of the PME film. (FIG. 6). The results show that membrane exhibits moduli in the sub-GPa range consistent with what is required for separators in electrochemical storage devices. Table 2 further enumerates the mechanical properties of the resulting PME film at 20° C. and 100° C.

TABLE 2

The Mechanical Strength Properties of the PME membrane

| Sample Temperature (° C.) | Storage Modulus E' (Pa) | Storage Modulus E'' (Pa) |
|---|---|---|
| 20° C. | $3.33 \times 10^8$ | $2.82 \times 10^7$ |
| 100° C. | $9.58 \times 10^7$ | $1.38 \times 10^7$ |

Methods of Casting the PME Precursor Solution onto the Electrode Surface

The PME precursor solution was cast onto an electrode used in a lithium-ion battery cell.

Figure 7:
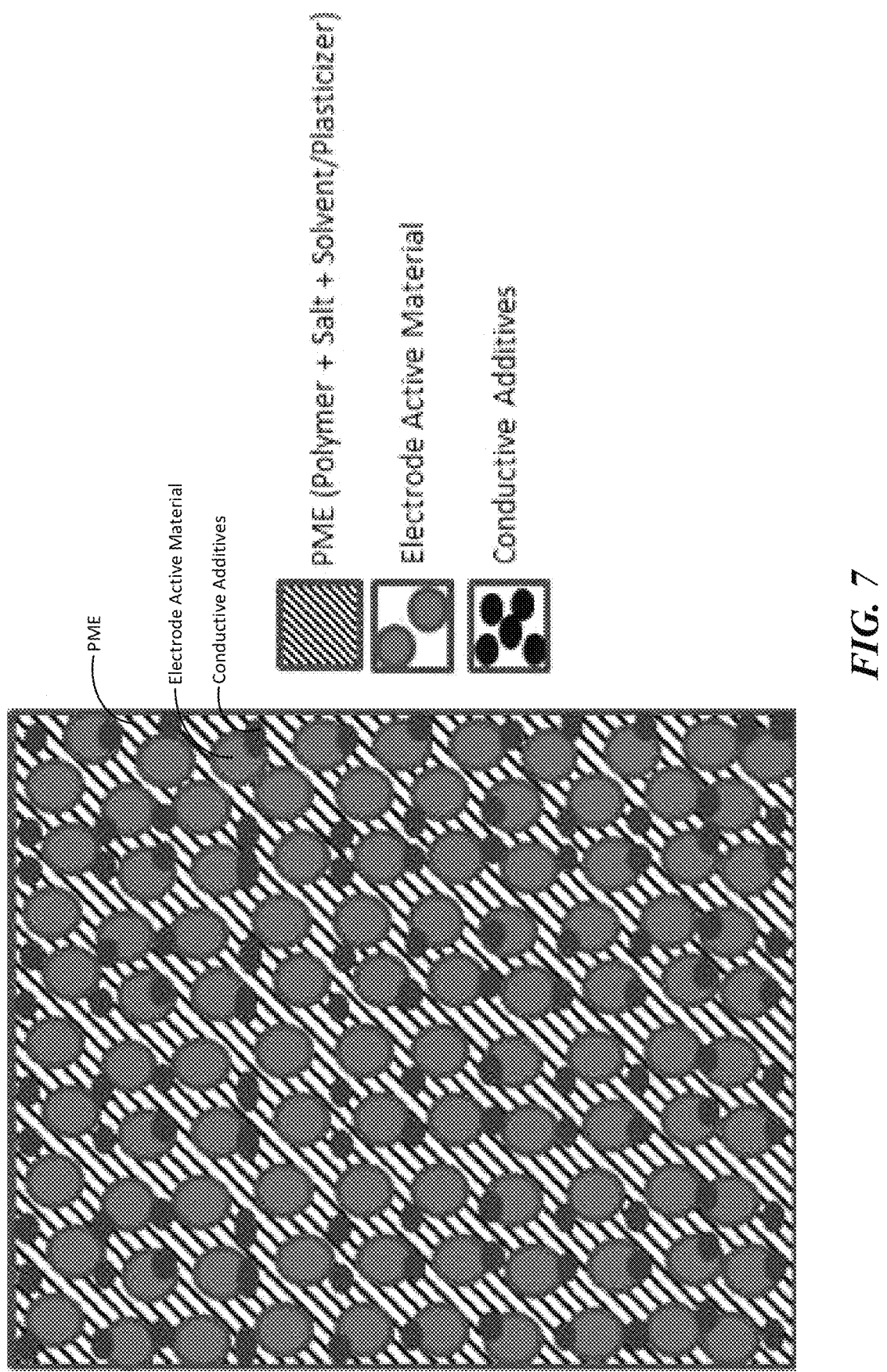
FIG. 7 is a representative schematic depicting a coated and/or calendared PME electrode prior to application of the PME overcoat onto a surface of an electrode.

As an initial step, the electrode is made from a slurry cast onto a current collector. The slurry usually consists of an active material that acts as either sink or source of the electroactive species in the storage device, a conductive additive to enhance the movement of electrons in the electrode, and a binder that is made with a binding polymer, a solvent, and a salt, and is in this case, the PME precursor solution. (FIG. 7).

Figure 8:
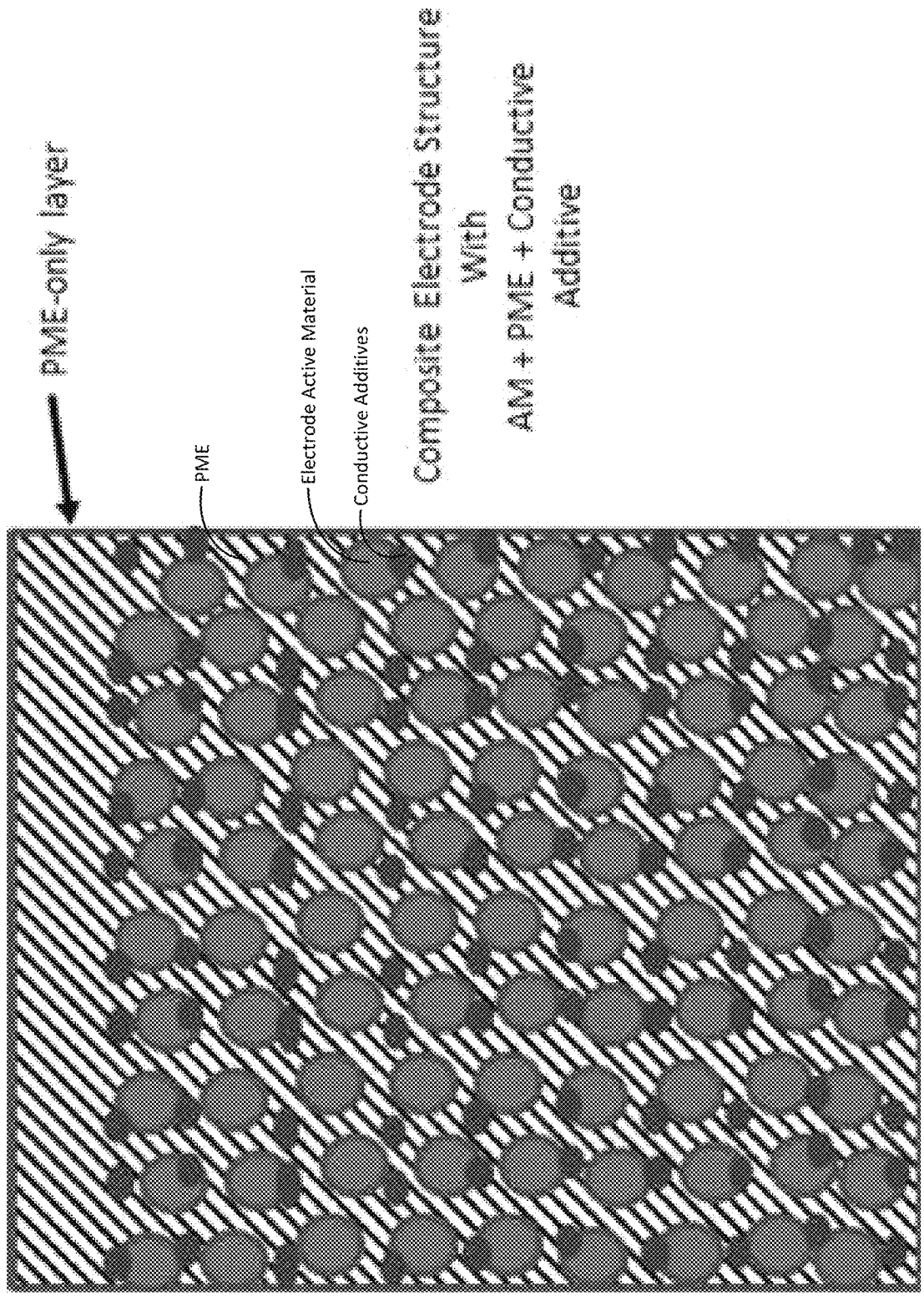
FIG. 8 is a representative schematic depicting a coated and/or calendared PME electrode after application of the PME overcoat onto a surface of an electrode forming a thin layer of the PME.

Next, a thin layered overcoat of the PME is applied to the surface of the electrode. The electrode is first cut and dried at an elevated temperature, after which the PME precursor solution is homogenously coated on the surface of the electrode. The coating operations is carried out at room temperature under dry room conditions and the coated electrode is then heated at 80° C. for 30 minutes. The resulting PME film has a thickness ranging between 10 μm-150 μm. (FIG. 8).

Conclusion

Figure 9:
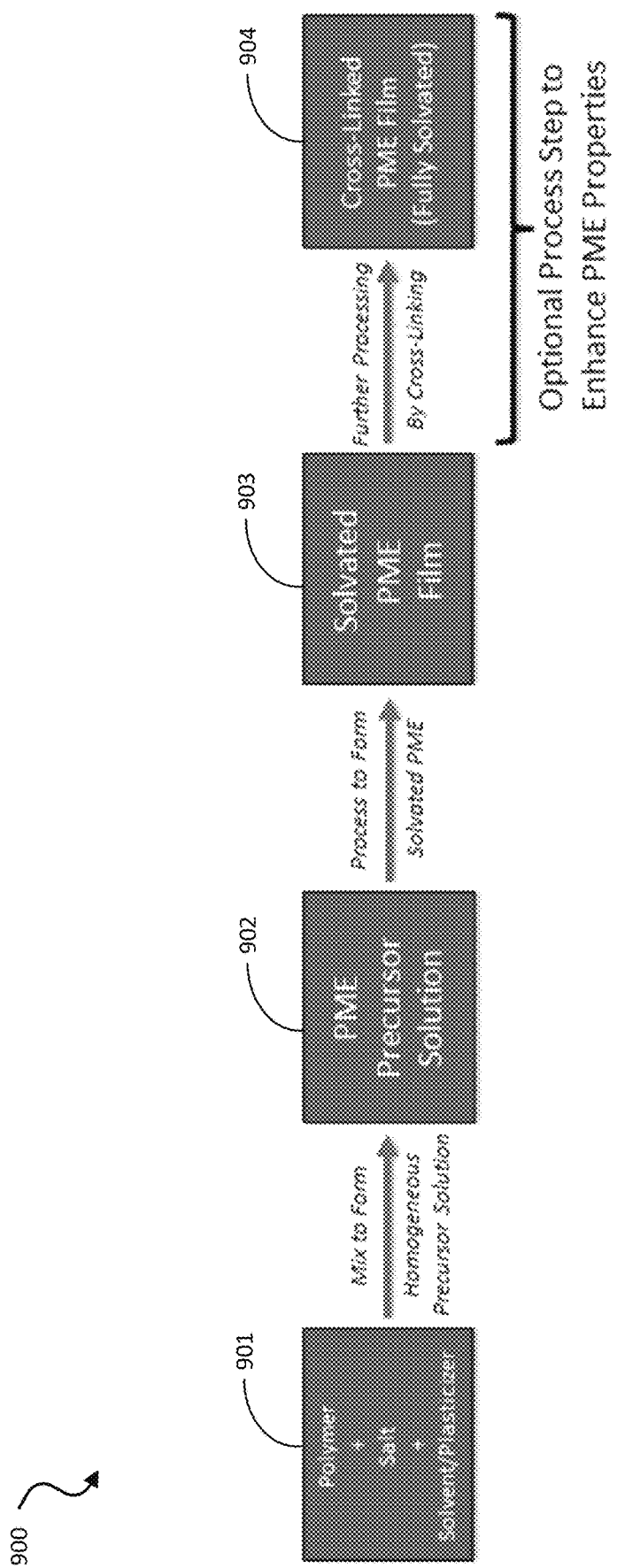
FIG. 9 is a representative schematic depicting a process flow diagram for manufacturing a functional PME according to an embodiment of the present disclosure.

The overall process of preparing the PME film is demonstrated in FIG. 9, labeled as process 900. As shown in FIG. 9, the PME film can be formed through a through simple and cost-effective four step process. As initial step, the three mixtures comprising the polymer, salt, and solvent/ plasticizer are prepared as show in step 901. The mixtures are then combined to form the homogenous PME precursor solution as shown in step 902. Next, the PME precursor is cast onto a substrate in step 903 to from a solvated PME film. The process further includes an optional step 904 in which the PME film can be cross-linked, in the fully solvated form, to enhance the properties of the PME.

Overall, this study provides the synthesis and characterization of an electrochemically stable, and mechanically robust PME with high conductivity and indifference to cell chemistries. In particular, so long as the electrochemical cell comprises a cathode, an anode, a liquid electrolyte, and a separator, the cell can be constructed using a PME of the present disclosure. In this regard, most energy storage and energy conversion devices, including cells like non-aqueous primary cells, aqueous primary cells, lithium primary and rechargeable cells, lithium-ion rechargeable cells, metal hydride cells, electrochemical capacitors, fuel cells, etc. can all be constructed with the PME of the present disclosure. Lastly, the PME is optimized not only for enhanced performance but also can be used for the development of a safer and more reliable batteries.

We claim:

1. A method of preparing a polymer matrix electrolyte (PME) precursor solution, the method comprising:
    (a) preparing a first solution comprising at least one polymer and a solvent;
    (b) preparing a second solution comprising a lithium salt, and a solvent; and
    (c) mixing the first solution with the second solution to form the PME precursor solution, wherein the PME precursor solution is used for making a PME membrane having a mechanical strength of about $10^5$ to about $10^{10}$ pascals (Pa), wherein the PME membrane has a storage modulus of about $3.33 \times 10^8$ Pa and a loss modulus of $2.82 \times 10^7$ Pa at 20° C., and wherein the PME membrane has no or substantially no pores.

2. The method of claim 1, further comprising dry casting the PME precursor solution onto a substrate to form a PME membrane.

3. The method of claim 1, further comprising preparing a third solution comprising a lithium salt and one or more additives in a solvent and mixing the third solution with the first and second solution in step (c).

4. The method of claim 3, wherein the one or more additives is selected from the group consisting of an inorganic particle, flame retardant, surfactant, film former, dissociation agent, and phase separation solution.

5. The method of claim 1, wherein the second solution further comprises one or more additives, one or more plasticizers, or both.

6. The method of claim 5, wherein the PME precursor solution comprises the one or more plasticizers in a mass fraction of about 1° C. to about 60%.

7. The method of claim 5, wherein the mass ratio of the one or more plasticizers to the PME precursor solution is about 1° C. to about 65%.

8. The method of claim 1, wherein the mass ratio of the polymer in the PME precursor solution can be about 1%, about 5%, about 25%, about 33%, about 50%, about 60%, about 70%, or about 80%.

9. The method of claim 1, wherein the PME precursor solution comprises solvent in a mass fraction of about 20% to about 90%.

10. The method of claim 1, wherein the PME precursor solution comprises the lithium salt in a mass fraction of about 1% to about 50%.

11. The method of claim 1, wherein the mass ratio of the lithium salt to the PME precursor solution is about 1% to about 65%.

12. The method of claim 1, wherein the method is performed under inert gas conditions, anhydrous conditions, or both.

13. A method of preparing a polymer matrix electrolyte (PME) membrane, the method comprising:
    (a) preparing a precursor solution comprising at least one polymer, at least one lithium salt, and at least one additive in a solvent;
    (b) dry casting the precursor solution onto a substrate to form the PME membrane, wherein the PME membrane has a mechanical strength of about $10^5$ to about $10^{10}$ (Pa), wherein the PME membrane has a storage modulus of about $3.33 \times 10^8$ Pa and a loss modulus of $2.82 \times 10^7$ Pa at 20° C., and wherein the PME membrane has no or substantially no pores.

14. The method of claim 13, wherein the precursor solution is formed by
    (a) preparing a first solution comprising at least one polymer and a solvent;
    (b) preparing a second solution comprising a lithium salt, and a solvent; and
    (c) mixing the first solution with the second solution to form the precursor solution.

15. The method of claim 14, further comprising preparing a third solution comprising a lithium salt and one or more additives in a solvent and mixing the third solution with the first and second solution in step (c).

16. The method of claim 13, wherein the substrate is an electrode or a dielectric film and the precursor solution is dry casted onto the surface of the electrode.

17. The method of claim 16, wherein the membrane is removed from the substrate to form a free-standing membrane.

18. A polymer matrix electrolyte (PME) membrane comprising a lithium salt and having mechanical strength of about $10^5$ to about $10^{10}$ pascals (Pa), wherein the PME membrane has no or substantially no pores.

19. The PME membrane of claim 18, wherein the PME membrane has a thickness of about 5 μm to about 100 μm.

20. The PME membrane of claim 18, wherein the PME membrane is stable up to a temperature of about 100° C.

21. The PME membrane of claim 18, wherein the PME membrane is ionically conductive over a temperature range of about −20° C. to about 90° C.

22. A polymer matrix electrolyte (PME) membrane comprising a lithium salt and having mechanical strength of about $10^5$ to about $10^{10}$ pascals (Pa), wherein the PME membrane has a storage modulus of about $3.33 \times 10^8$ Pa and a loss modulus of $2.82 \times 10^7$ Pa at 20° C., and wherein the PME membrane has no or substantially no pores.

23. A polymer matrix electrolyte (PME) membrane comprising a lithium salt and having mechanical strength of about $10^5$ to about $10^{10}$ pascals (Pa), wherein the PME membrane has a storage modulus of $9.58 \times 10^7$ Pa and a loss modulus of $1.38 \times 10^7$ Pa at 100° C., and wherein the pme membrane has no or substantially no pores.

24. A polymer matrix electrolyte (PME) membrane having mechanical strength of about $10^5$ to about $10^{10}$ pascals (Pa), wherein the PME membrane has a storage modulus of about $3.33 \times 10^8$ Pa and a loss modulus of $2.82 \times 10^7$ Pa at 20° C., and wherein the PME membrane has no or substantially no pores.

25. The PME membrane of claim 24, wherein the PME membrane has a thickness of about 5 μm to about 100 μm.

26. The PME membrane of claim 24, wherein the PME membrane is stable up to a temperature of about 100° C.

27. The PME membrane of claim 24, wherein the PME membrane is ionically conductive over a temperature range of about −20° C. to about 90° C.

28. A polymer matrix electrolyte (PME) membrane having mechanical strength of about $10^5$ to about $10^{10}$ pascals (Pa), wherein the PME membrane has a storage modulus of $9.58 \times 10^7$ Pa and a loss modulus of $1.38 \times 10^7$ Pa at 100° C., and wherein the PME membrane has no or substantially no pores.

29. The PME membrane of claim 28, wherein the PME membrane has a thickness of about 5 μm to about 100 μm.

30. The PME membrane of claim 28, wherein the PME membrane is stable up to a temperature of about 100° C.

31. The PME membrane of claim 28, wherein the PME membrane is ionically conductive over a temperature range of about −20° C. to about 90° C.

\* \* \* \* \*